(12) United States Patent
Yamada

(10) Patent No.: US 9,329,549 B2
(45) Date of Patent: May 3, 2016

(54) IMAGE FORMING SYSTEM AND STORAGE MEDIUM INCLUDING PROGRAM FOR PORTABLE TERMINAL DEVICE INCLUDED IN IMAGE FORMING SYSTEM AND STORAGE MEDIUM INCLUDING PROGRAM FOR IMAGE FORMING APPARATUS

(71) Applicant: KYOCERA Document Solutions Inc., Osaka (JP)

(72) Inventor: Yohei Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/796,613

(22) Filed: Jul. 10, 2015

(65) Prior Publication Data

US 2016/0026137 A1    Jan. 28, 2016

(30) Foreign Application Priority Data

Jul. 25, 2014   (JP) .................................. 2014-151753

(51) Int. Cl.
*G06F 3/12* (2006.01)
*G03G 15/00* (2006.01)

(52) U.S. Cl.
CPC .......... *G03G 15/502* (2013.01); *G03G 15/5016* (2013.01); *G06F 3/1203* (2013.01)

(58) Field of Classification Search
CPC ............ G03G 15/502; G03G 15/5016; G03G 2215/00109; G06F 3/1204; G06F 3/1203
See application file for complete search history.

(56) References Cited

U.S. PATENT DOCUMENTS

2001/0019964 A1*  9/2001  Shimizu .................... G06F 1/30
                                                              455/557
2003/0025935 A1*  2/2003  Somei .................... G06F 3/1207
                                                             358/1.15

FOREIGN PATENT DOCUMENTS

JP             2002-047839 A      2/2002

* cited by examiner

*Primary Examiner* — David Gray
*Assistant Examiner* — Michael Harrison
(74) *Attorney, Agent, or Firm* — Studebaker & Brackett PC

(57) ABSTRACT

An image forming system includes a portable terminal device and an image forming apparatus. The device includes a first storage part, a transmitting part transmitting data of an image stored in the first storage part wirelessly, a displaying part, a first operation part receiving a first operation of selecting the image and a second operation of selecting printing, and a transmission controlling part carrying out first transmission control to cause the transmitting part to transmit the data before a print setting screen is displayed on the displaying part when the first operation and the second operation are carried out if a remaining amount of a battery is smaller than a predetermined threshold value. The apparatus includes a second storage part storing the data transmitted by the first transmission control and a printing part executing a print job printing the image of the data stored in the second storage part.

15 Claims, 18 Drawing Sheets

IMAGE FORMING SYSTEM AND STORAGE MEDIUM INCLUDING PROGRAM FOR PORTABLE TERMINAL DEVICE INCLUDED IN IMAGE FORMING SYSTEM AND STORAGE MEDIUM INCLUDING PROGRAM FOR IMAGE FORMING APPARATUS

INCORPORATION BY REFERENCE

This application is based on and claims the benefit of priority from Japanese Patent application No. 2014-151753 filed on Jul. 25, 2014, the entire contents of which are incorporated herein by reference.

BACKGROUND

The present disclosure relates to an image forming system printing an image indicated by data transmitted from a portable terminal device by wireless communication in an image forming apparatus, a storage medium including a program for portable terminal device executed by this system and a storage medium including a program for image forming apparatus.

As a system operating a main apparatus by a portable device utilizing wireless communication, for example, a keyless entry for motor vehicle is known. In order to prevent a problem with operation of the main apparatus from occurring even if a remaining amount of a battery of the portable device is small, a technique of taking countermeasures against a case in which the remaining amount of the battery of the portable device is small is suggested.

There is a technique transmitting data indicative of an image stored in a portable terminal device, such as a smart phone, by wireless communication, and then, printing the data indicated by the transmitted data in the image forming apparatus. It is desirable that, even if the remaining amount of the battery of the portable terminal device is small, a problem with image printing does not occur.

SUMMARY

In accordance with one aspect of the present disclosure, an image forming system includes a portable terminal device and an image forming apparatus. The portable terminal device includes a first storage part configured to store data indicative of an image, a transmitting part configured to transmit the data stored in the first storage part by wireless communication, a displaying part, a first operation part configured to receive a first operation of selecting the image and a second operation of selecting printing and a transmission controlling part configured to carry out first transmission control to cause the transmitting part to transmit the data before a print setting screen is displayed on the displaying part when the first operation and the second operation are carried out, in a case where a remaining amount of a battery as a power source of the portable terminal device is smaller than a predetermined threshold value. The image forming apparatus includes a second storage part configured to store the data transmitted by the first transmission control and a printing part configured to execute a print job printing the image indicated by the data stored in the second storage part.

In accordance with another aspect of the present disclosure, a storage medium storing a program for a portable terminal device is a storage medium included in the portable terminal device to store the program for the portable terminal device causing a computer of the portable terminal device to execute image data transmission. The program causes the first storage part to store data indicative of an image; transmits the data stored in the first storage part by wireless communication; causes a first operation part to receives a first operation of selecting the image and a second operation of selecting printing; and carries out first transmission control to transmit the data stored in the first storage part, before a displaying part of the portable terminal device is caused to display a print setting screen, when the first operation and the second operation are carried out, in a case where a remaining amount of a battery as a power source of the portable terminal device is smaller than a predetermined threshold value.

In accordance with a further aspect of the present disclosure, a storage medium storing a program for an image forming apparatus is a storage medium included in the image forming apparatus capable of communicating with the portable terminal device including the storage medium storing the above-mentioned program for the portable terminal device to store the program for the image forming apparatus causing a computer of the image forming apparatus to execute a print job. The program causes a second storage part to store the data transmitted by the first transmission control in accordance with executing of the program for portable terminal device and executes a print job to print the image indicated by the data stored in the second storage part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
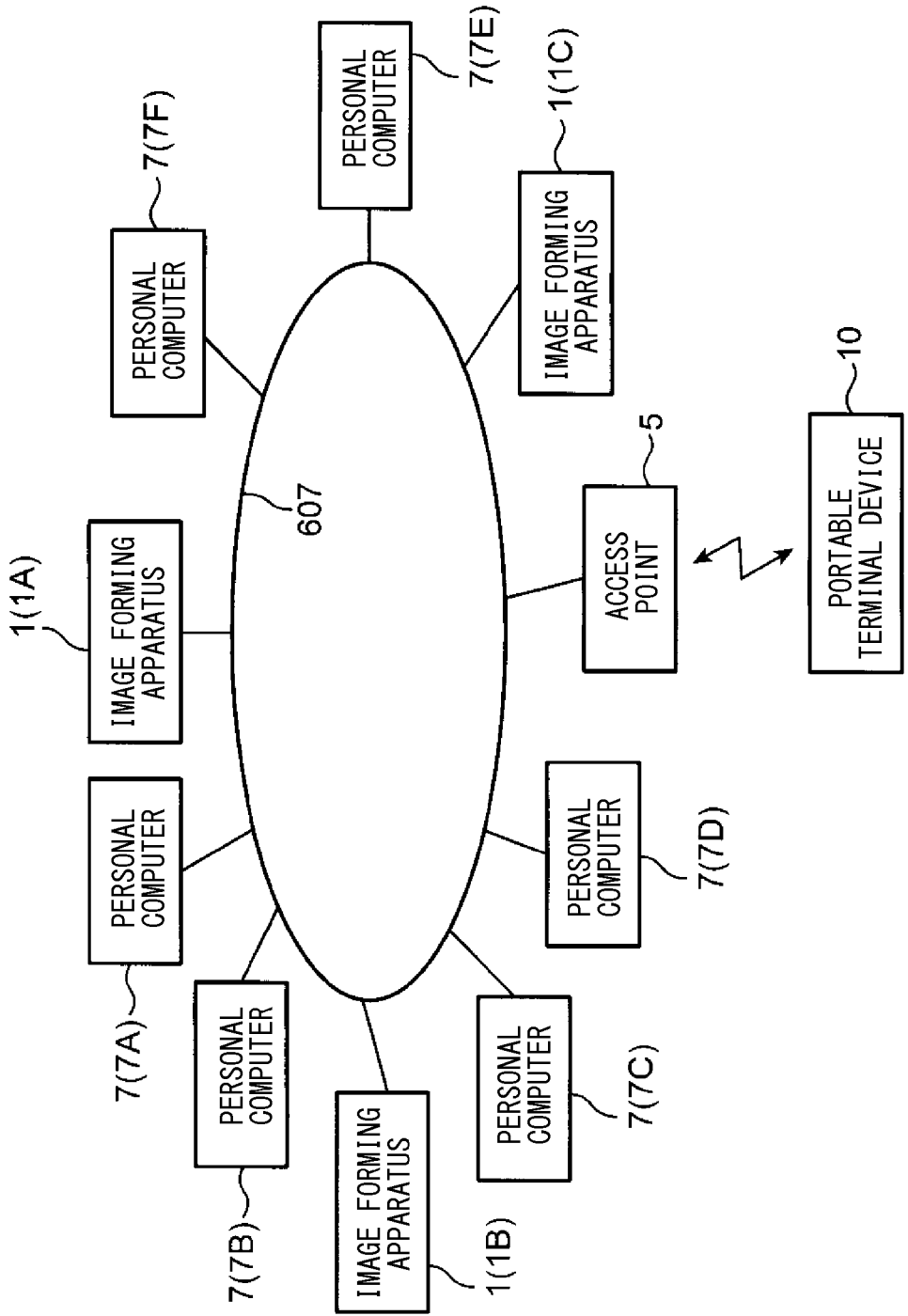
FIG. 1 is a block diagram showing a configuration of an image forming system according to an embodiment of the present disclosure.

In the following, an embodiment of the present disclosure will be described in detail with reference to the drawings. FIG. 1 is a schematic view showing a configuration of an image forming system 3 according to the embodiment of the present disclosure. The image forming system 3 includes an image forming apparatus 1, a personal computer 7, an access point 5 and a portable terminal device 10.

The image forming apparatus 1 is connected to a wired LAN (Local Area Network) 607. FIG. 1 shows a plurality of image forming apparatuses 1A, 1B and 1C connected to the LAN 607. In a case where there is no need to discriminate these apparatuses from each other, they are referred to as image forming apparatuses 1. The number of image forming apparatuses 1 may be one.

The personal computer 7 is connected to the LAN 607. FIG. 1 shows a plurality of personal computers 7A, 7B, 7C, 7D, 7E and 7F connected to the LAN 607. In a case where there is no need to discriminate these computers from each other, they are referred to as personal computers 7. The number of personal computers 7 may be one or there may be no personal computer 7.

The access point 5 is connected to the LAN 607. Wireless communication between the access point 5 and the portable terminal device 10 is a wireless LAN, for example. The access point 5 connects the portable terminal device 10 and the LAN 607 to each other. In this manner, the portable terminal device 10 transmits data indicative of an image to the image forming apparatus 1, and the image forming apparatus 1 can print the image indicated by that data.

FIG. 1 shows one access point 5 connected to the LAN 607. The number of access points 5 may be plural. Also, FIG. 1 shows one portable terminal device 10 capable of wirelessly communicating with the access point 5. The number of portable terminal devices 10 may be plural.

Figure 2:
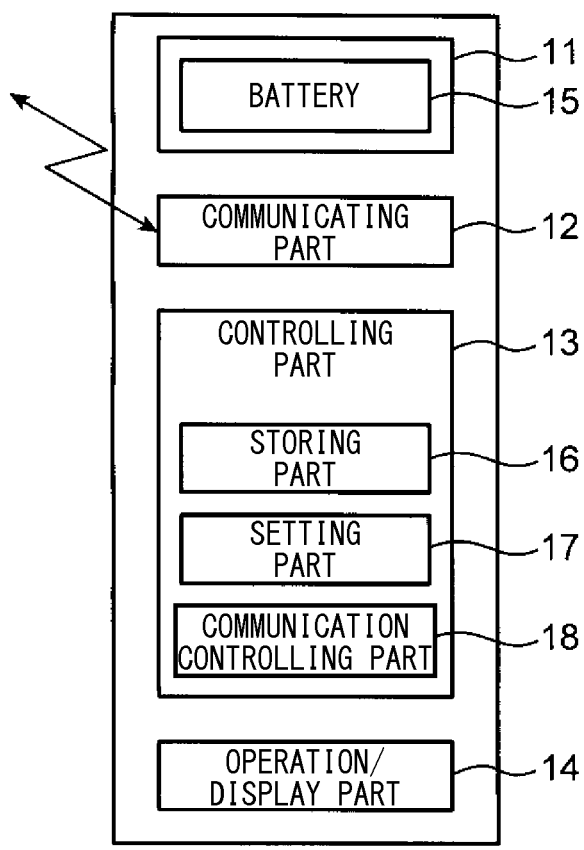
FIG. 2 is a block diagram showing a configuration of a portable terminal device included in the image forming system according to the embodiment.

FIG. 2 is a bock diagram showing a configuration of the portable terminal device 10. The portable terminal device 10 is a portable device, such as a smart phone, a tablet terminal, a cellular phone and a PDA (Personal Digital Assistant), for example.

The portable terminal device 10 includes a battery housing part 11, a communicating part 12 (a transmitting part), a controlling part 13, and an operation/display part 14.

In the battery housing part 11, a battery 15 as a power source of the portable terminal device 10 is housed. Although the battery 15 is a charging battery, it may be a primary battery without being limited thereto.

The communicating part 12 is a communication interface to execute wireless communication.

The controlling part 13 includes a CPU (Central Processing Unit), a storage medium, such as a ROM (Read Only Memory), and a RAM (Random Access Memory). The controlling part 13 executes control of working the portable terminal device 10, and is a computer, in other words. The controlling part 13 includes a storage part 16 (a first storage part), a setting part 17, and a communication controlling part 18 (a transmission controlling part) as a functional block. For example, in the ROM of the controlling part 13, a program for portable terminal device may be stored, and the CPU of the controlling part 13 executes the program for portable terminal device to make the portable terminal device 10 execute functions such of image data transmission and others.

The storage part 16 works as the first storage part to store data indicative of an image. This data may be data indicative of an image which can be printed in the image forming apparatus 1, and hereinafter, it is referred to as image data. A format of the image data is JPEG, PDF or the like, for example. The communicating part 12 works as a transmitting part transmitting the image data stored in the storage part 16, by wireless communication.

In a case where a remaining amount of the battery 15 is smaller than a predetermined threshold value, first transmission control as described later is carried out. The setting part 17, by the first transmission control, sets a destination of image data to be transmitted to the image forming apparatus 1. This setting may be automatically carried out or may be manually carried out.

In automatic setting, there is utilized a history as to how frequently the portable terminal device 10 causes the image forming apparatus 1 shown in FIG. 1 to print the image indicated by the image data stored in the storage part 16. The setting part 17, on the basis of this history, sets the destination to the image forming apparatus 1 which is frequently used, from among a plurality of image forming apparatuses 1. In manual setting, a user of the portable terminal device 10 selects the image forming apparatus 1 in advance from among the plurality of image forming apparatuses 1. The setting part 17 sets the destination to the selected image forming apparatus 1.

The communication controlling part 18 controls the communicating part 12, and causes the communicating part 12 to carry out transmission processing or reception processing.

The operation/display part 14 is a touch panel-type user interface including a displaying part, such as a liquid crystal display panel. In the operation/display part 14, various operations for working the portable terminal device 10 are carried out. The operation/display part 14 works as a first operation part to receive the first operation, the second operation and the third operation. The first operation is to select the image data indicative of the image to be printed from among the image data stored in the storage part 16. The second operation is to select printing. The third operation is to instruct printing of the image selected in the first operation. Incidentally, the portable terminal device 10 may be a manner including a displaying part and an operation part having hard keys without including the operation/display part 14.

The communication controlling part 18 works as a transmission controlling part and makes first transmission control. The first transmission control is to cause the communicating part 12 to transmit image data before a print setting screen 40

(FIG. 8) is displayed on the operation/display part 14, when the first operation and the second operation are carried out, in a case where the remaining amount of battery 15 as the power source of the portable terminal device 10 is smaller than a predetermined threshold value. The predetermined threshold value is the remaining amount of the battery 15 with which a problem may occur in a process in which the image data indicative of the image stored in the portable terminal device 10 is transmitted by wireless communication and the image forming apparatus 1 prints the image indicated by the transmitted image data. For example, the threshold value can be set as the remaining amount of the battery 15 allowing the operation/display part 14 to make the first operation and the second operation and allowing the communicating part 12 to transmit the image data to the image forming apparatus 1. This is a mere example, and the threshold value may be greater than this setting.

Figure 3:
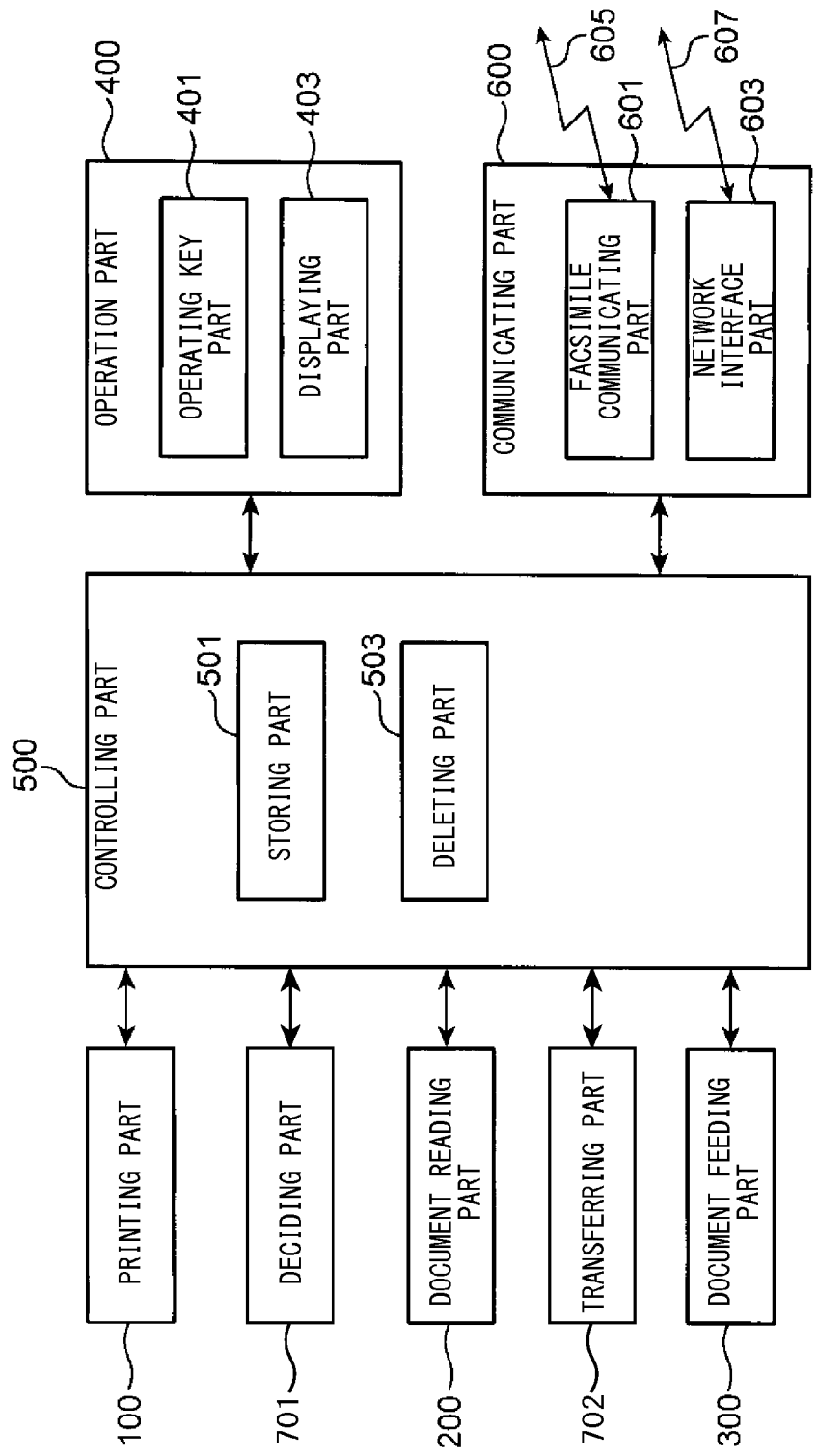
FIG. 3 is a block diagram showing a configuration of an image forming apparatus in the image forming system according to the embodiment.

FIG. 3 is a block diagram showing a configuration of the image forming apparatus 1. As the image forming apparatus 1, a digital multifunction peripheral having functions of a copying machine, a printer, a scanner, and a facsimile will be described by way of example. It is sufficient if the image forming apparatus 1 is an apparatus having a function of printing an image, and this apparatus is not limited to the digital multifunction periphery. For example, a printer may be employed as the image forming apparatus 1. The image forming apparatus 1 includes a printing part 100, a document reading part 200, a document feeding part 300, an operation part 400 (a second operation part), a controlling part 500, and a communicating part 600.

The document feeding part 300, in a case where one document is placed on a document placement part provided at the document feeding part 300, feeds that document to the document reading part 200, and in a case where a plurality of documents are placed on the document placement part, continuously feeds the plurality of documents to the document reading part 200.

The document reading part 200 reads the document placed on a platen or the document fed from the document feeding part 300 and outputs image data of that document.

The printing part 100 executes a print job. The print job is a job to produce, as to data indicative of an image (for example, image data transmitted from the portable terminal device 10, image data outputted from the document reading part 200, print data transmitted from the personal computer 7 and image data received by the facsimile), a printed matter obtained by printing the image indicated by that data.

The operation part 400 includes an operating key part 401 and a displaying part 403. The displaying part 403 has a touch panel function to display a screen including soft keys. A user operates soft keys while watching the screen, whereby settings or the like required to execute a function, such as copy, are carried out.

At the operating key part 401, operating keys made of hard keys are provided. The operating keys are a start key, numeric keys, a reset key and function switching keys for switching copy, a printer, a scanner and a facsimile, for example.

The controlling part 500 includes a CPU, a storage medium, such as a ROM, and a RAM. The CPU executes control required to work the image forming apparatus 1 for the above-mentioned constituent elements (for example, the printing part 100) of the image forming apparatus 1, and is a computer, in other words. The ROM stores software, such as a program for image forming apparatus, required to control working of the image forming apparatus 1. The RAM is utilized for temporary storage of data generated at the time of execution of software, for storage of application software and other storage. For example, the CPU of the controlling part 500 may execute the program for image forming apparatus, whereby the image forming apparatus 1 may be caused to execute a function, such as print.

The controlling part 500 includes a storage part 501 and a deleting part 503 as functional blocks. Such blocks will be described later in detail.

The communicating part 600 includes a facsimile communicating part 601 and a network interface part 603. The facsimile communicating part 601 includes an NCU (Network Controlling part) controlling connection of a telephone line to a destination facsimile and a modulation/demodulation circuit modulating/demodulating a signal for facsimile communication. The facsimile communicating part 601 is connected to a telephone line 605.

The network interface part 603 is connected to a LAN (Local Area Network) 607. The network interface part 603 is a communication interface circuit for executing communication with the personal computer 7, with another image forming apparatus 1 and with the access point 5.

The storage part 501 works as a second storage part to store image data (first data) transmitted by the first transmission control. A part of a document box of the image forming apparatus 1 can be employed as the storage part 501. The document box can be composed of a hard disk drive included in the image forming apparatus 1.

The deleting part 503 deletes the image data and transmitted from the portable terminal device 10 by wireless communication stored in the storage part 501 in accordance with a predetermined condition. Therefore, it is possible to prevent that available capacity of the storage part 501 is decreased because the data indicative of the image transmitted from the portable terminal device 10 is accumulated into the storage part 501 (the second storage part) of the image forming apparatus 1.

Incidentally, the operation part 400 works as the second operation part and makes an operation of print setting of the image indicated by the image data stored in the storage part 501 and an operation of instructing the print job to print that image. When the operation of print setting is carried out and the operation of instructing the print job is carried out at the operation part 400, the printing part 100 executes the print job on the basis of print setting. This is a mode in a case where the battery 15 of the portable terminal device 10 is exhausted. In a case where the communication controlling part 18 could transmit setting data indicative of print setting inputted to the print setting screen 40 and a printing start command to the transmitting part 12, the printing part 100 executes the print job on the basis of the print setting indicated by the setting data. This is a mode in a case where the battery 15 of the portable terminal device 10 is not exhausted.

Several scenarios of action of the image forming system 3 are considered. These scenarios will be described mainly with reference to FIG. 1 to FIG. 3. First, a common scenario will be described.

1. Common Scenario

Figure 4:
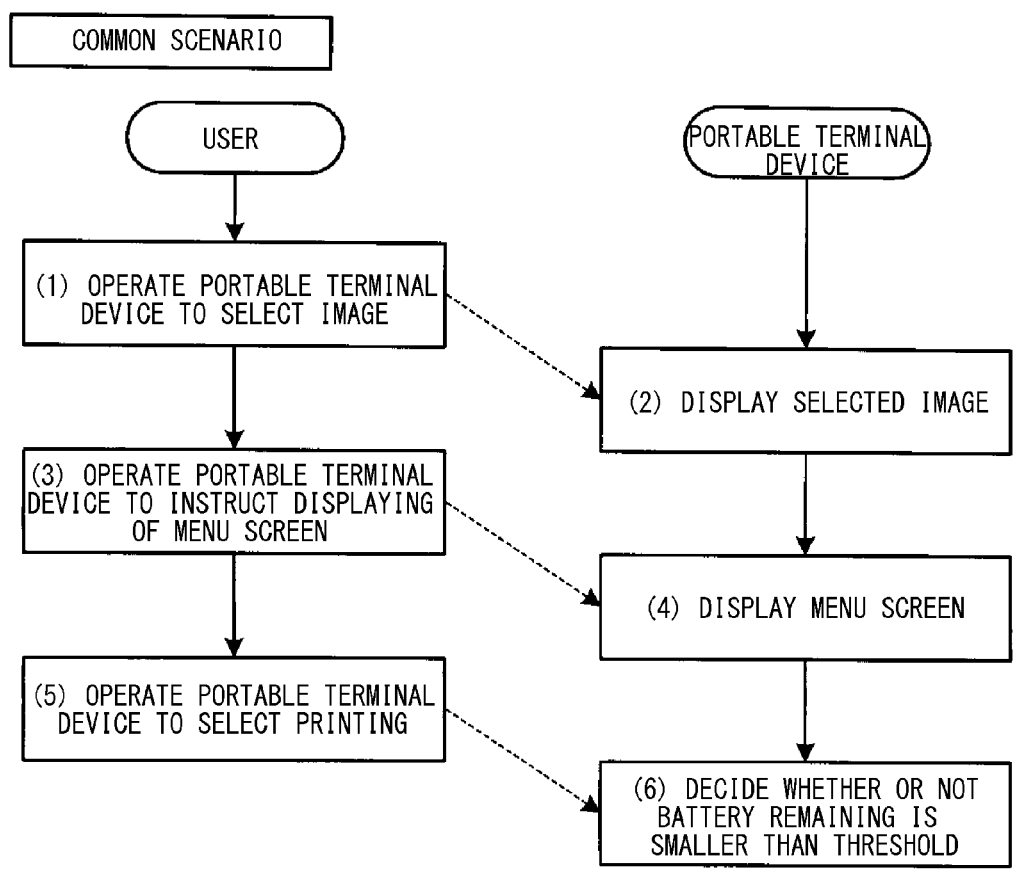
FIG. 4 is a flowchart schematically showing a common scenario in operation of the image forming system according to the embodiment.

FIG. 4 is an illustrative view illustrating schematically the common scenario. The common scenario is composed of the first step to the sixth step below.

(First Step)

A user operates the operation/display part 14 (a first operation part) of the portable terminal device 10 and selects the image (for example, an image 21 shown in FIG. 5) as a target for printing from among the images indicated by the image data stored in the storage part 16 (the first storage part). This operation is a first operation of selecting the image.

(Second Step)

Figure 5:
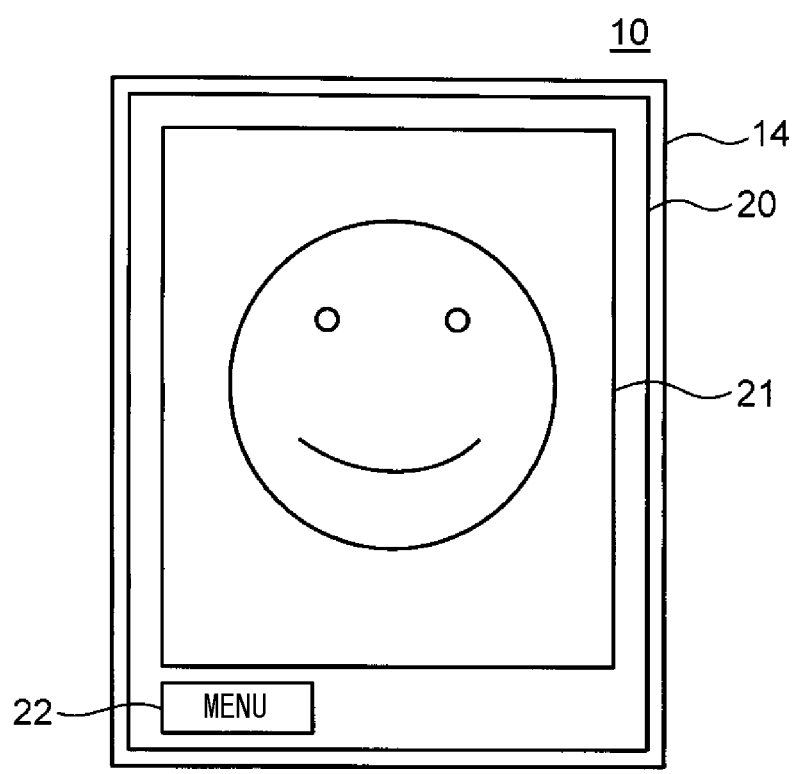
FIG. 5 is a plan view showing a portable terminal device in which a selection image screen is displayed on an operation/display part.
Figure 6:
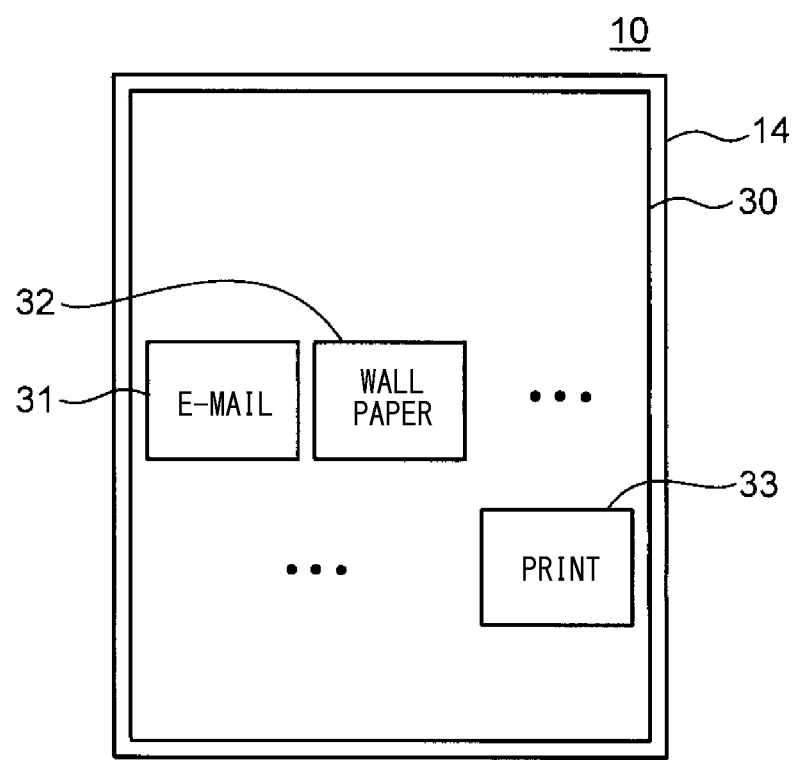
FIG. 6 is a plan view showing a portable terminal device in which a menu screen is displayed on an operation/display part.

By the first operation, in the portable terminal device 10, the controlling part 13, as shown in FIG. 5, causes the operation/display part 14 to display a selection image screen 20 including the image 21. FIG. 5 is a plan view showing the portable terminal device 10 in which the selection image screen 20 is displayed on the operation/display part 14. The selection image screen 20 is a screen indicating that the image 21 is selected. In the selection image screen 20, in addition to the image 21, an icon 22 is included. The icon 22 is employed for an instruction to display a menu screen 30 (FIG. 6).

(Third Step)

The user touches the icon 22 to supply the instruction to display the menu screen 30.

(Fourth Step)

When the icon 22 is touched, in the portable terminal device 10, the controlling part 13, as shown in FIG. 6, switches the screen displayed on the operation/display part 14 from the selection image screen 20 to the menu screen 30. FIG. 6 is a plan view showing the portable terminal device 10 in which the menu screen 30 is displayed on the operation/display part 14.

In the menu screen 30, icons for carrying out various processing operations as to the image 21 are included. FIG. 6 shows icons 31, 32 and 33. When the icon 31 is touched, the controlling part 13 shifts to an operation mode attaching the image 21 to e-mail. When the icon 32 is touched, the controlling part 13 shifts to an operation mode setting up the image 21 on the wall paper of the operation/display part 14. When the icon 33 is touched, the controlling part 13 shifts to an operation mode printing the image 21.

(Fifth Step)

The user touches the icon 33 to supply an instruction to select printing. This operation is a second operation of selecting printing.

(Sixth Step)

When the second operation is carried out, in the portable terminal device 10, the controlling part 13 decides whether or not the remaining amount of the battery 15 is smaller than a predetermined threshold value before the print setting screen 40 (FIG. 8) is displayed on the operation/display part 14.

The common scenario has been described hereinabove.

In a case where the remaining amount of the battery 15 is the threshold value or more at the sixth step, scenario 1 and scenario 2 are applied. In a case where the remaining amount of the battery 15 is smaller than the threshold value, scenario 3 to scenario 11 are applied.

2. Scenario 1

Figure 7:
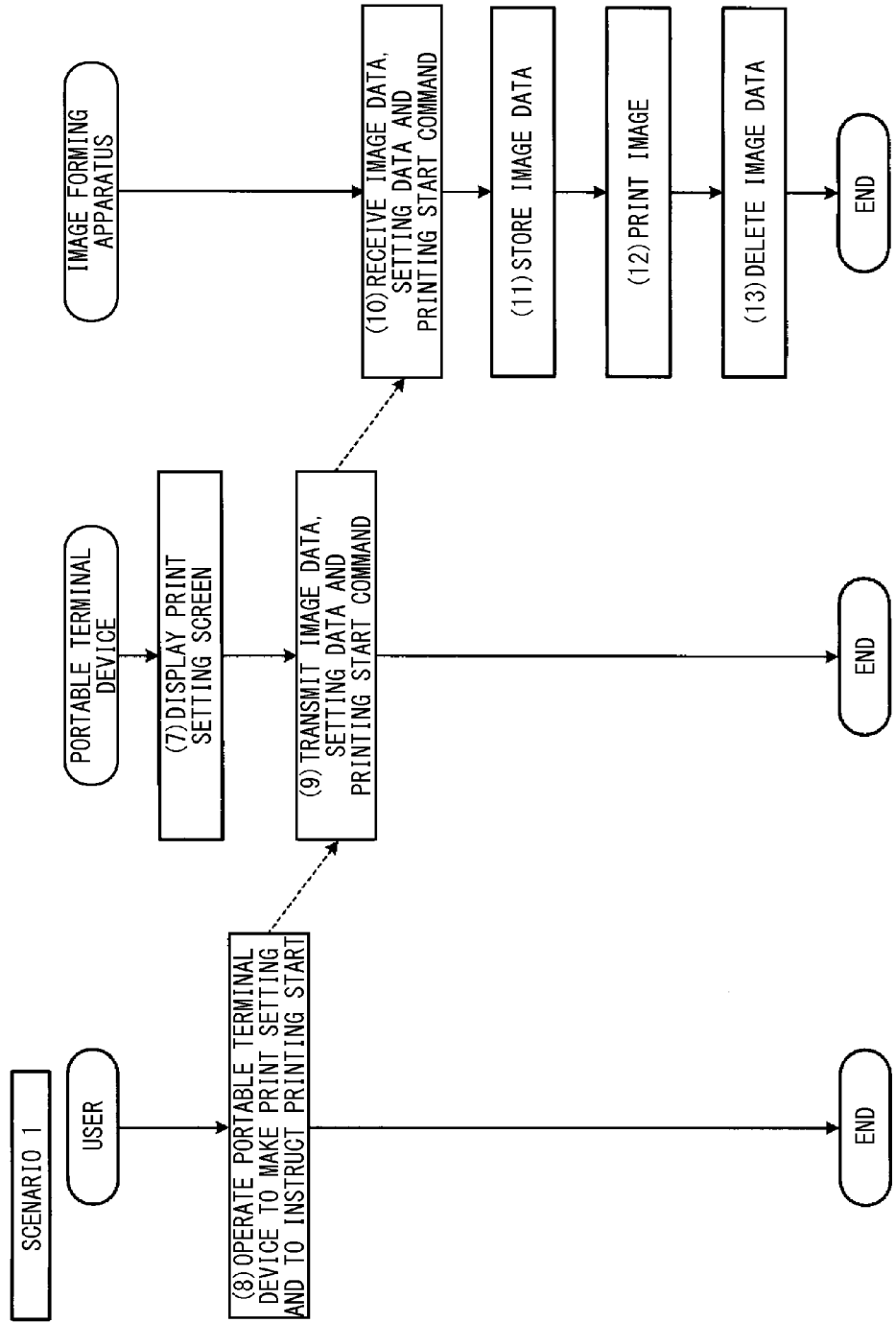
FIG. 7 is a flowchart schematically showing scenario 1 in operation of the image forming system according to the embodiment.

FIG. 7 is an illustrative view illustrating schematically scenario 1. In scenario 1, printing is executed in the case where the remaining amount of the battery 15 is the threshold value or more. Scenario 1 is composed of the seventh step to the thirteenth step below.

(Seventh Step)

Figure 8:
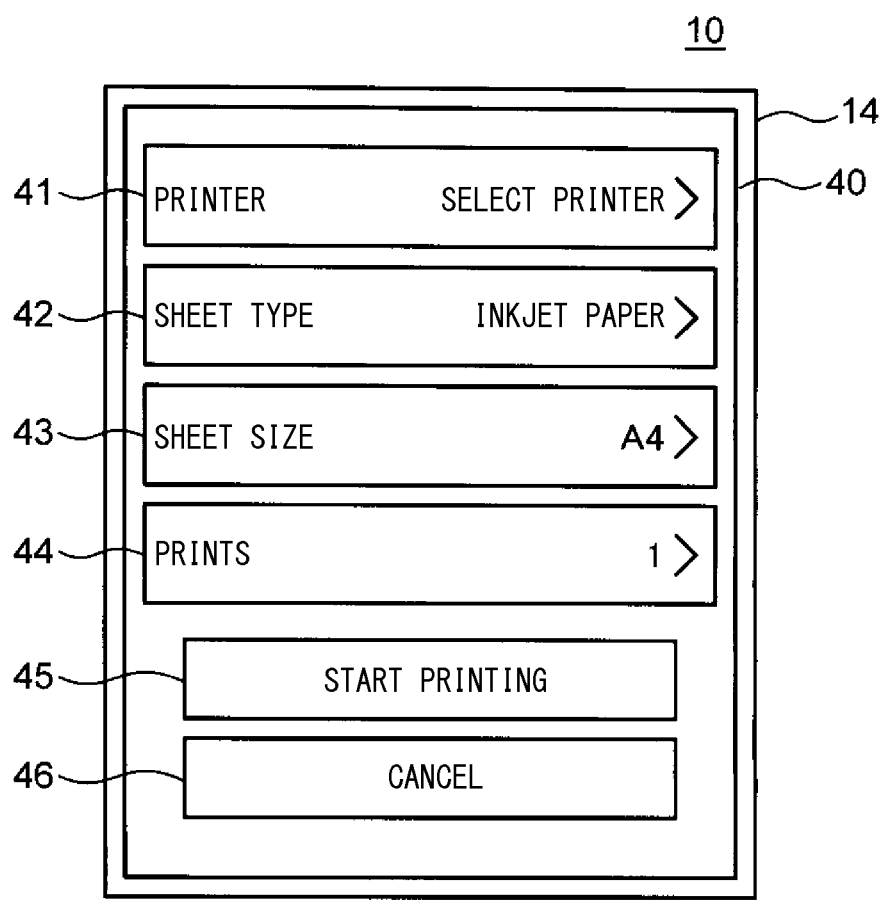
FIG. 8 is a plan view showing a portable terminal device in which a print setting screen is displayed on an operation/display part.

At the fifth step shown in FIG. 4, the icon 33 shown in FIG. 6 is touched and an instruction to select printing is supplied. In the portable terminal device 10, the controlling part 13 switches the screen displayed on the operation/display part 14 from the menu screen 30 to the print setting screen 40 shown in FIG. 8. FIG. 8 is a plan view showing the portable terminal device 10 in which the print setting screen 40 is displayed on the operation/display part 14.

The print setting screen 40 includes various icons 41 to 46.

When the icon 41 is touched, the controlling part 13 switches the screen displayed on the operation/display part 14 from the print setting screen 40 to a screen for setting a printer to make possible setting of the printer on that screen. That is, from among image forming device 1A, 1B and 1C, an image forming device 1 to execute a print job is selected.

When the icon 42 is touched, the controlling part 13 switches the screen displayed on the operation/display part 14 from the print setting screen 40 to a screen for setting a kind of a sheet (sheet type) to make possible setting of the kind of the sheet on the screen.

When the icon 43 is touched, the controlling part 13 switches the screen displayed on the operation/display part 14 from the print setting screen 40 to a screen for setting a size of the sheet to make possible setting of the size of the sheet on that screen.

When the icon 44 is touched, the controlling part 13 switches the screen displayed on the operation/display part 14 from the print setting screen 40 to a screen for setting the number of prints to make possible setting of the number of prints on that screen.

The icon 45 is employed to instruct start of printing. When the icon 45 is touched, the communication controlling part 18 causes the communicating part 12 to transmit the image data indicative of the image 21, the data indicative of the print setting inputted onto the print setting screen 40 (hereinafter, setting data) and the printing start command by wireless communication. This operation is a third operation of instructing printing of image.

The icon 46 is employed to cancel selection of printing. When the icon 46 is touched, the setting data mentioned above is deleted and the controlling part 13 switches the screen displayed on the operation/display part 14 from the print setting screen 40 to an upper hierarchical screen than this screen, for example, to an initial screen.

(Eighth Step)

The user touches the icons 41 to 44 to carry out print setting. Here, it is presumed that the image forming apparatus 1A is selected as a printer. Then, the icon 45 is touched.

(Ninth Step)

When the icon 45 is touched, in the portable terminal device 10, the communication controlling part 18 transmits the image data indicative of the image 21, the setting data and the printing start command to the communicating part 12 by wireless communication (second transmission control).

(Tenth Step)

The image data indicative of the image 21, the setting data and the printing start command are received at the access point 5 shown in FIG. 1. The access point 5 transmits them to the image forming apparatus 1A by utilizing the LAN 607. In this manner, the image data indicative of the image 21, the setting data and the printing start command are received by a network interface part 603 of the image forming apparatus 1A.

(Eleventh Step)

In the image forming apparatus 1A, the controlling part 500 stores, in the storage part 501, the image data (second data) indicative of the image 21 received by the network interface part 603 at the tenth step (the second transmission control).

(Twelfth Step)

In the image forming apparatus 1A, the controlling part 500 reads out the image data indicative of the image 21 stored in the storage part 501 and causes the printing part 100 to execute the print job printing the image 21 on the basis of the setting data (the second data) received by the network interface part 603 at the tenth step (the second transmission control).

(Thirteenth Step)

When the image 21 is printed, the image data indicative of the image 21 stored in the storage part 501 is unrequired.

Therefore, in the image forming apparatus 1A, the deleting part 503 deletes the image data (the first data and the second data) indicative of the image 21 stored in the storage part 501 after the twelfth step (in a case where a print job is executed as to the second data).

3. Scenario 2

Figure 9:
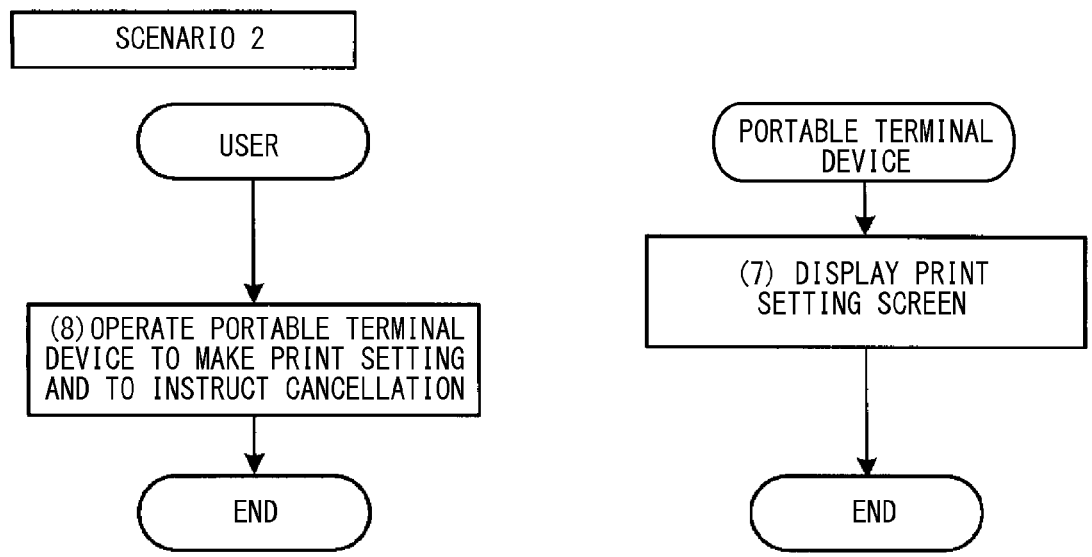
FIG. 9 is a flowchart schematically showing scenario 2 in operation of the image forming system according to the embodiment.

FIG. 9 is an illustrative view illustrating schematically scenario 2. Scenario 2 cancels printing in the case where the remaining amount of the battery 15 is the threshold value or more. Scenario 2 is composed of the seventh step and the eighth step below.

(Seventh Step)

This step is the same as the seventh step of scenario 1 shown in FIG. 7, and therefore, a duplicate description is omitted.

(Eighth Step)

The user operates the icons 41 to 44 shown in FIG. 8 to carry out the print setting on the print setting screen 40, and then, the user touches the icon 46. In this manner, in the portable terminal device 10, the controlling part 13 cancels selection of printing the image 21. Incidentally, if the user touches the icon 46 before carrying out the print setting on the print setting screen 40, similar processing is carried out.

4. Scenario 3

Figure 10:
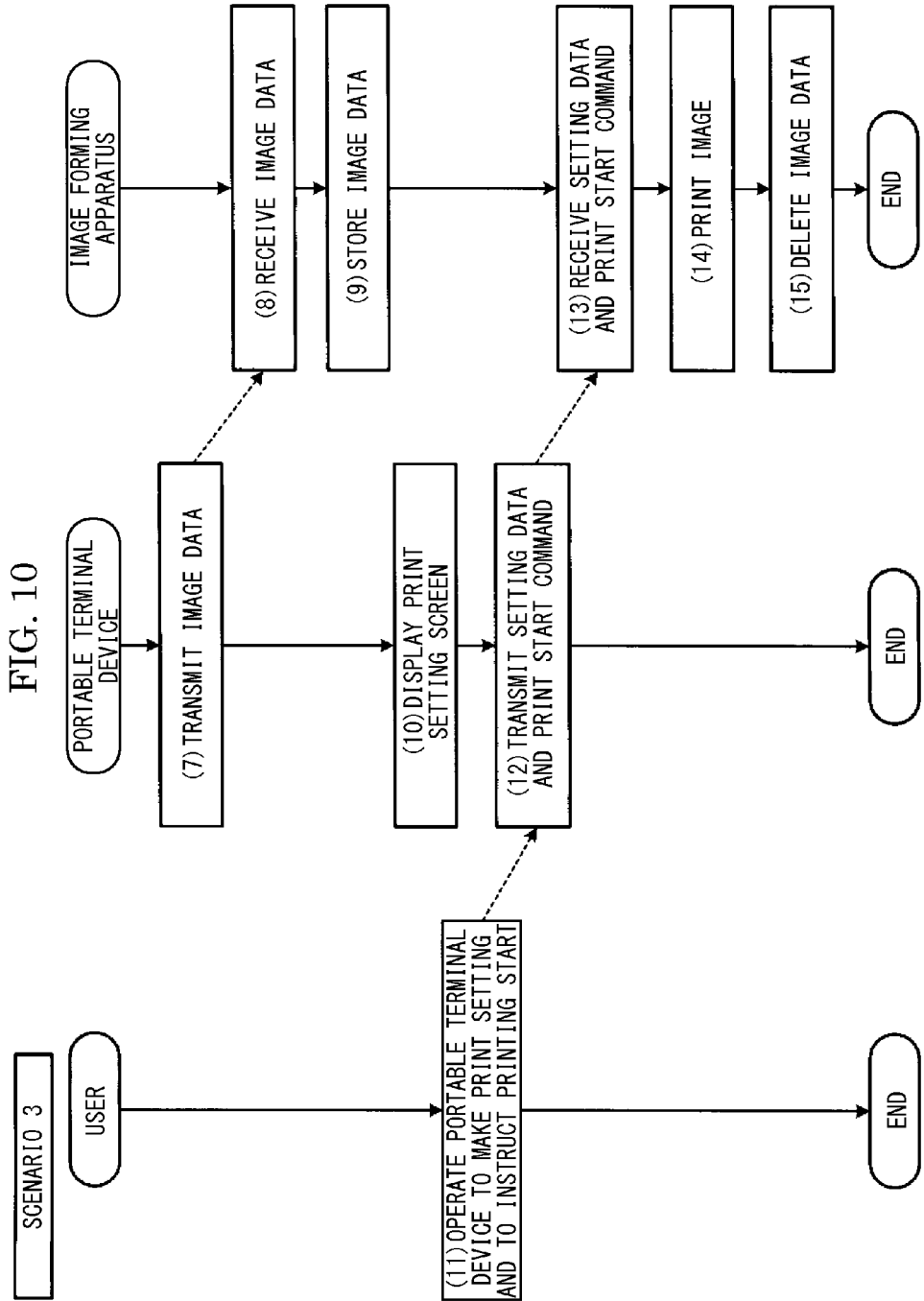
FIG. 10 is a flowchart schematically showing scenario 3 in operation of the image forming system according to the embodiment.

FIG. 10 is an illustrative view illustrating schematically scenario 3. In scenario 3, in the case where the remaining amount of the battery 15 is smaller than the threshold value, the battery 15 is not exhausted while in operation of the portable terminal device 10 and printing is executed. Scenario 3 is composed of the seventh step to the fifteenth step below.

(Seventh Step)

As has been described in the sixth step of FIG. 4, in the portable terminal device 10, in a case where the controlling part 13 decides that the remaining amount of the battery 15 is smaller than the threshold value, the communication controlling part 18 carries out control causing the communicating part 12 to transmit the image data indicative of the image 21 by wireless communication (the first transmission control). Incidentally, it is presumed that, when the first transmission control is carried out, the setting part 17 presets the destination of the image data to be transmitted to the image forming apparatus 1B.

(Eighth Step)

The image data indicative of the image 21 is received at the access point 5 (FIG. 1). The access point 5 transmits the data to the image forming apparatus 1B by utilizing the LAN 607. In this manner, the image data indicative of the image 21 is received at the network interface part 603 of the image forming apparatus 1B.

(Ninth Step)

In the image forming apparatus 1B, the controlling part 500 causes the storage part 501 to store the image data indicative of the image 21 received by the network interface part 603.

(Tenth Step)

This step is the same as the seventh step of scenario 1 shown in FIG. 7, that is, after the first transmission control, the controlling part 13 causes the operation/display part 14 to display the print setting screen 40, but a detailed description is omitted. Since the destination of the image data indicative of the image 21 to be transmitted is preset to the image forming apparatus 1B, and therefore, in the icon 41 shown in FIG. 8, it is indicated that the image forming apparatus 1B is selected.

(Eleventh Step)

The user touches the icons 42 to 44 shown in FIG. 8 to carry out the print setting. Then, the icon 45 is touched.

(Twelfth Step)

In this manner, in the portable terminal device 10, the communication controlling part 18 causes the communicating part 12 to transmit the setting data and the printing start command by wireless communication. The setting data is data indicative of print setting inputted onto the print setting screen 40. Incidentally, the image data indicative of the image 21 has already been transmitted at the seventh step.

(Thirteenth Step)

The setting data and the printing start command are received at the access point 5. The access point 5 transmits them to the image forming apparatus 1B by utilizing the LAN 607. In this manner, the setting and the printing start command are received by the network interface part 603 of the image forming apparatus 1B.

(Fourteenth Step)

In the image forming apparatus 1B, the controlling part 500 reads out the image data indicative of the image 21 stored in the storage part 501 and causes the printing part 100 to execute a print job printing the image 21 on the basis of the setting data received by the network interface part 603 at the thirteenth step.

(Fifteenth Step)

In the image forming apparatus 1B, the deleting part 503 deletes the image data indicative of the image 21 stored in the storage part 501 after the fourteenth step.

As has been described above, according to the embodiment, in the image forming system 3, in a case where the remaining amount of the battery 15 of the potable terminal device 10 is small, before the print setting screen 40 is displayed on the operation/display part 14 (the displaying part) of the potable terminal device 10, the portable terminal device 10 transmits the data indicative of the image to the image forming apparatus 1 and that data is stored in the storage part 501 (the second storage part) included in the portable forming apparatus 1. Therefore, before the print setting is completed on the print setting screen 40 of the portable terminal device 10, even if the battery 5 of the portable terminal device 10 is exhausted, the user operates the image forming apparatus 1, whereby the image can be printed. On the other hand, if the print setting is completed on the print setting screen 40 of the portable terminal device 10 without exhaustion of the battery 15 of the portable terminal device 10, the portable terminal device 10 transmits the setting data indicative of the printing setting to the image forming apparatus 1, whereby the image can be printed in the image forming apparatus 1. As described above, with the image forming system 3 according to the present disclosure, even if the remaining amount of the battery 15 of the portable terminal device 10 is small, the portable terminal device 10 transmits the data indicative of the image to the image forming apparatus 1 by wireless communication and the image forming apparatus 1 can print the image indicated by that data.

Also, according to the embodiment, the deleting part 503 defines a predetermined condition as a case in which the print job is executed.

5. Scenario 4

Figure 11:
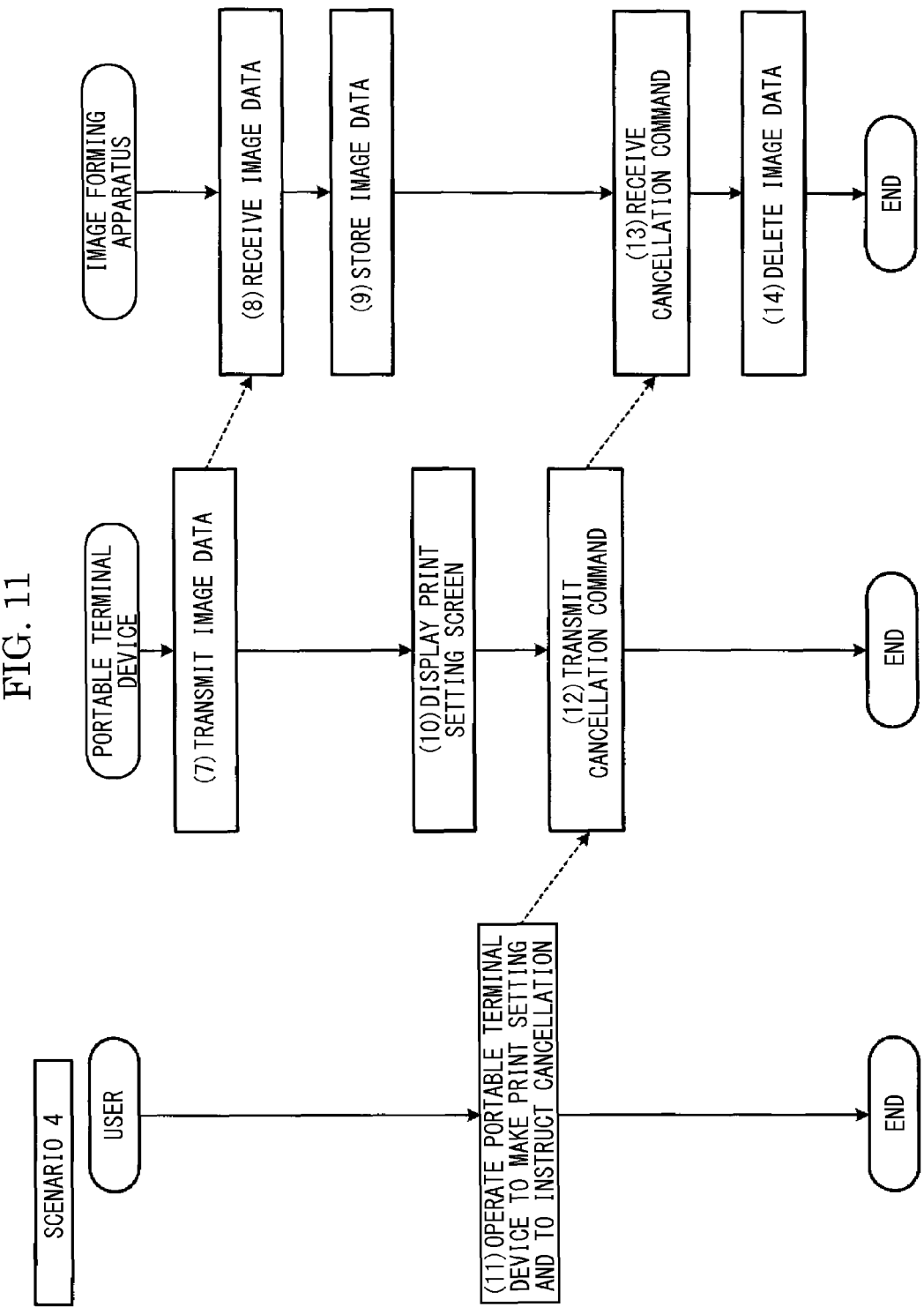
FIG. 11 is a flowchart schematically showing scenario 4 in operation of the image forming system according to the embodiment.

FIG. 11 is an illustrative view illustrating schematically scenario 4. In scenario 4, in the case where the remaining amount of the battery 15 is smaller than the threshold value, the battery 15 is not exhausted while in operation of the portable terminal device 10 and printing is cancelled. Scenario 4 is composed of the seventh step to the fourteenth step below.

(Seventh Step) to (Tenth Step)

These steps are the same as the seventh step to the tenth step of scenario 3 shown in FIG. 10, and therefore, a duplicate description is omitted.

(Eleventh Step)

This step is the same as the eighth step of scenario 2 shown in FIG. 9, and therefore, a duplicate description is omitted.

(Twelfth Step)

In the portable terminal device 10, the communication controlling part 18 causes the communicating part 12 to transmit a printing cancellation command by wireless communication. The destination of transmission is the image forming apparatus 1B preset by the setting part 17. Since the image data indicative of the image 21 has already been stored in the storage part 501 of the image forming apparatus 1B, the destination is set in order to this image.

(Thirteenth Step)

The printing cancellation command is received at the access point 5. The access point 5 transmits this command to the image forming apparatus 1B by utilizing the LAN 607. In this manner, the printing cancellation command is received by the network interface part 603 of the image forming apparatus 1B.

(Fourteenth Step)

In the image forming apparatus 1B, the deleting part 503 deletes the image data indicative of the image 21 stored in the storage part 501 on the basis of the cancellation command in the thirteenth step.

That is, according to the embodiment, the deleting part 503 defines a predetermined condition as a case in which the communication controlling part 18 (the transmission controlling part) causes the communicating part 12 (the transmitting part) to transmit the printing cancellation command.

6. Scenario 5

Figure 12:
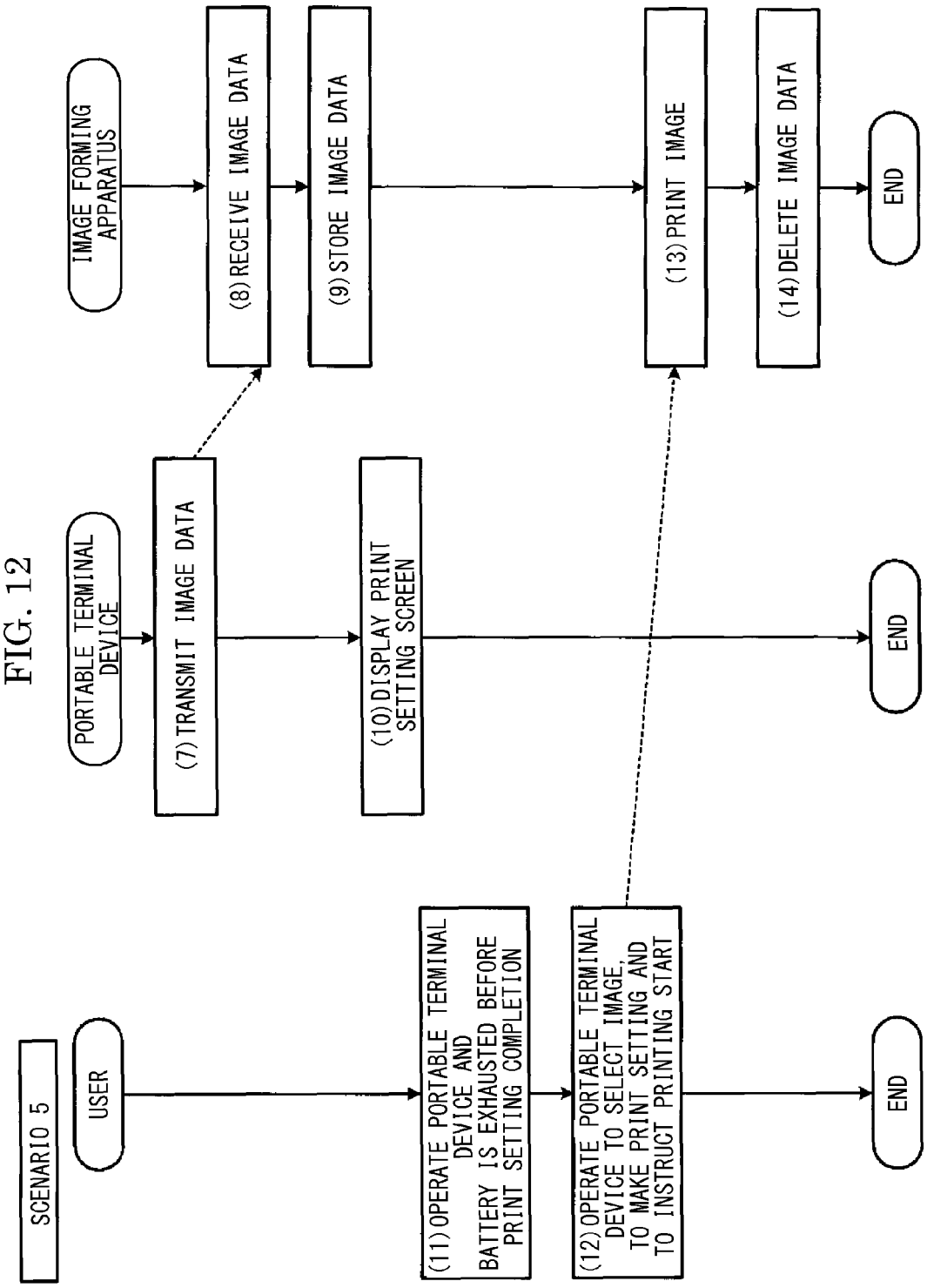
FIG. 12 is a flowchart schematically showing scenario 5 in operation of the image forming system according to the embodiment.

FIG. 12 is an illustrative view illustrating schematically scenario 5. In scenario 5, in the case where the remaining amount of the battery 15 is smaller than the threshold value, the battery 15 is exhausted while in operation of the portable terminal device 10 and printing is executed. Scenario 5 is composed of the seventh step to the fourteenth step below.

(Seventh Step) to (Tenth Step)

These steps are the same as the seventh step to the tenth step of scenario 3 shown in FIG. 10, and therefore, a duplicate description is omitted.

(Eleventh Step)

Before the user completes the print setting on the print setting screen 40 shown in FIG. 8, the battery 15 is exhausted.

(Twelfth Step)

In the tenth step, on the print setting screen 40, the image forming apparatus 1B is displayed as the destination of the image data indicative of the image 21 to be transmitted. The user of the portable terminal device 10 operates the operation part 400 to open the document box of the image forming apparatus 1B and to select the image 21 in the image forming apparatus 1B. The controlling part 500 causes the displaying part 403 to display the same screen as the print setting screen 40 shown in FIG. 8. On the print setting screen 40 displayed on the displaying part 403, the print setting is provided, and the icon 45 is touched.

(Thirteenth Step)

In this manner, in the image forming apparatus 1B, the controlling part 500 reads out the image data indicative of the image 21 stored in the storage part 501 and executes the printing part 100 to execute a print job for this data.

(Fourteenth Step)

In the image forming apparatus 1B, the deleting part 503 deletes the image data indicative of the image 21 stored in the storage part 501 after the thirteenth step.

As has been described above, in the image forming system, in a case where the battery is exhausted before the print setting is completed on the print setting screen of the portable terminal device, the user of the portable terminal device operates the image forming apparatus, whereby the image can be printed.

7. Scenario 6

Figure 13:
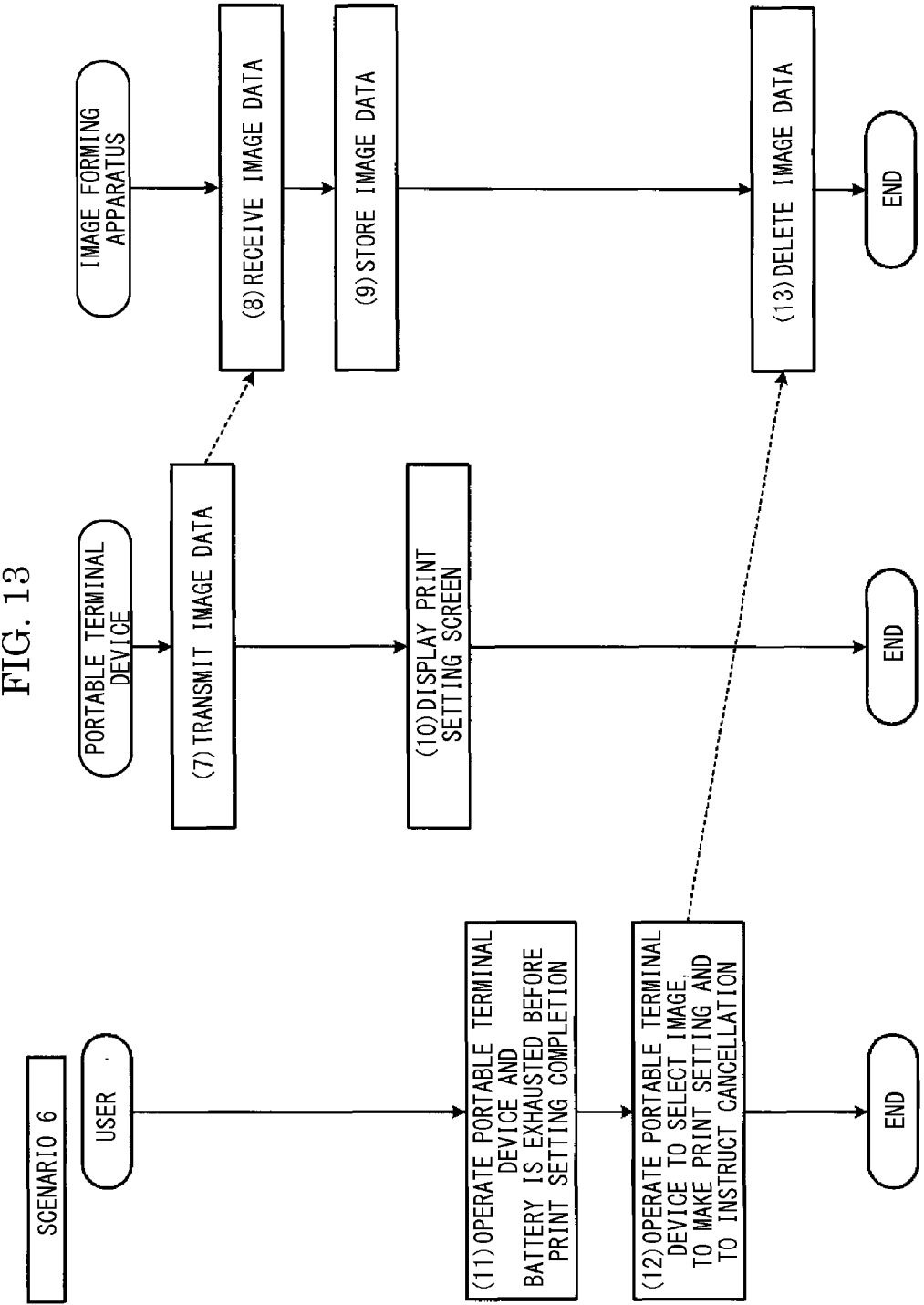
FIG. 13 is a flowchart schematically showing scenario 6 in operation of the image forming system according to the embodiment.

FIG. 13 is an illustrative view illustrating schematically scenario 6. In scenario 6, in the case where the remaining amount of the battery 15 is smaller than the threshold value, the battery 15 is exhausted while in operation of the portable terminal device 10 and printing is cancelled. Scenario 6 is composed of the seventh step to the thirteenth step below.

(Seventh Step) to (Eleventh Step)

These steps are the same as the seventh step to the eleventh step of scenario 5 shown in FIG. 12, and therefore, a duplicate description is omitted.

(Twelfth Step)

The user of the portable terminal device 10 operates the operation part 400 to open the document box of the image forming apparatus 1B and to select the image 21 in the image forming apparatus 1B. The controlling part 500 causes the displaying part 403 to display the same screen as the print setting screen 40 shown in FIG. 8. The print setting is carried out on the print setting screen 40 displayed on the displaying part 403 and the icon 46 is touched. That is, in the operation part 400 (the second operation part), an operation of cancelling a print job is carried out as to the data stored in the storage part 501 (the second storage part). Incidentally, the icon 46 may be touched before the print setting.

(Thirteenth Step)

In the image forming apparatus 1B, the deleting part 503 deletes the image data indicative of the image 21 stored in the storage part 501 in accordance with a print cancellation instruction.

8. Scenario 7

Figure 14:
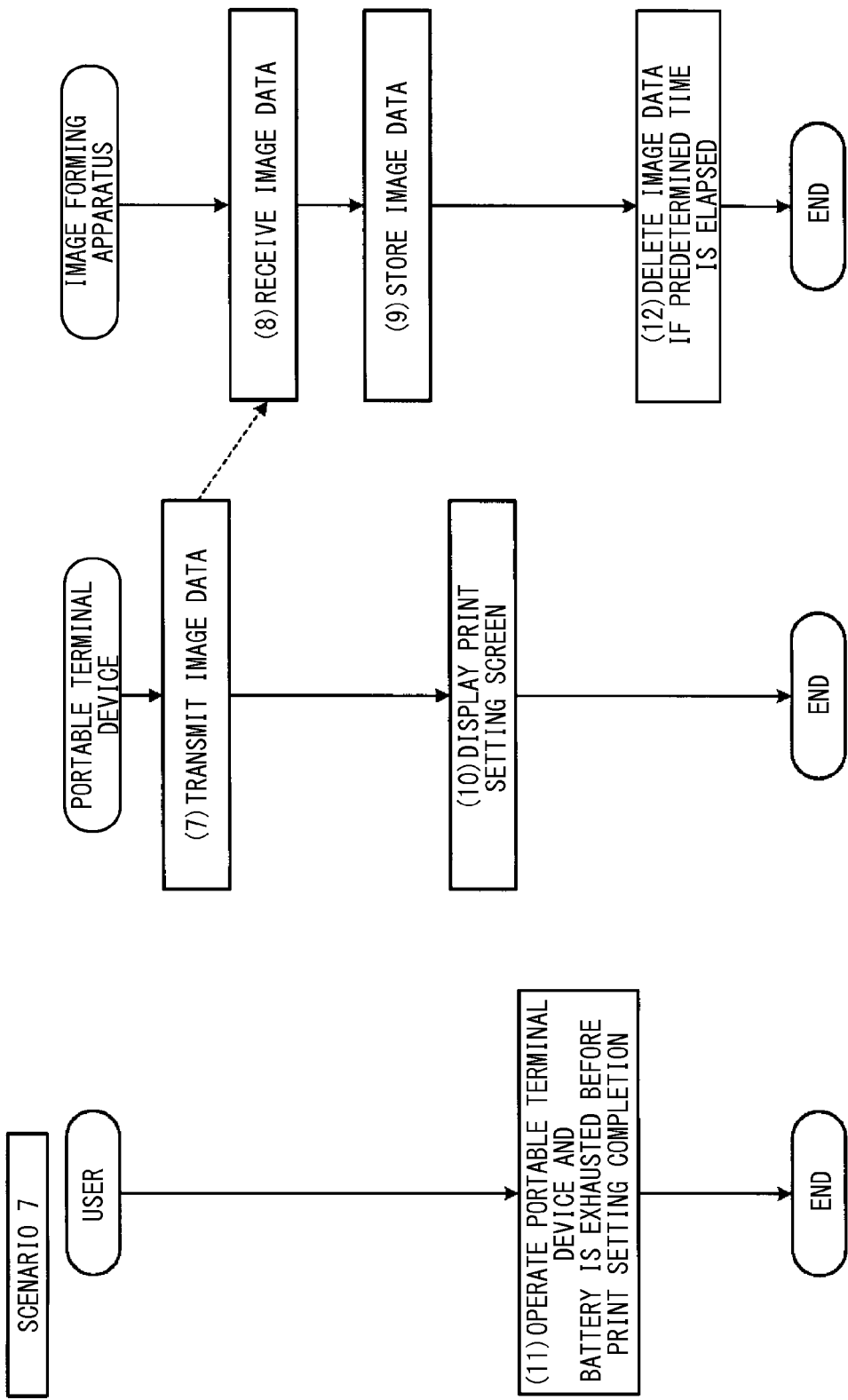
FIG. 14 is a flowchart schematically showing scenario 7 in operation of the image forming system according to the embodiment.

FIG. 14 is an illustrative view illustrating schematically scenario 7. In scenario 7, in the case where the remaining amount of the battery 15 is smaller than the threshold value, the battery 15 is exhausted while in operation of the portable terminal device 10, and in the image forming apparatus 1B, an operation of executing a print job is not carried out. Scenario 7 is composed of the seventh step to the twelfth step below.

(Seventh Step) to (Eleventh Step)

These steps are the same as the seventh step to the eleventh step of scenario 5 shown in FIG. 12, and therefore, a duplicate description is omitted.

(Twelfth Step)

In the image forming apparatus 1B, the controlling part 500 starts a timer included in the controlling part 500 when the image data indicative of the image 21 is stored in the storage part 501. The controlling part 500 stores information about predetermined time (for example, one hour) in advance. When the controlling part 500 decides that the time measured by the timer has elapsed the predetermined time, the deleting part 503 deletes the image data indicative of the image 21 stored in the storage part 501. Thus, in a case where the image 21 is not printed until the predetermined time has elapsed after the image data indicative of the image 21 has been stored in the storage part 501, it is decided that the image 21 is not printed and the image data indicative of the image 21 is deleted from the storage part 501.

That is, according to the embodiment, the deleting part 503 defines a predetermined condition as a case in which the predetermined time has elapsed after the data has been stored in the storage part 501 (the second storage part).

9. Scenario 8

Figure 15:
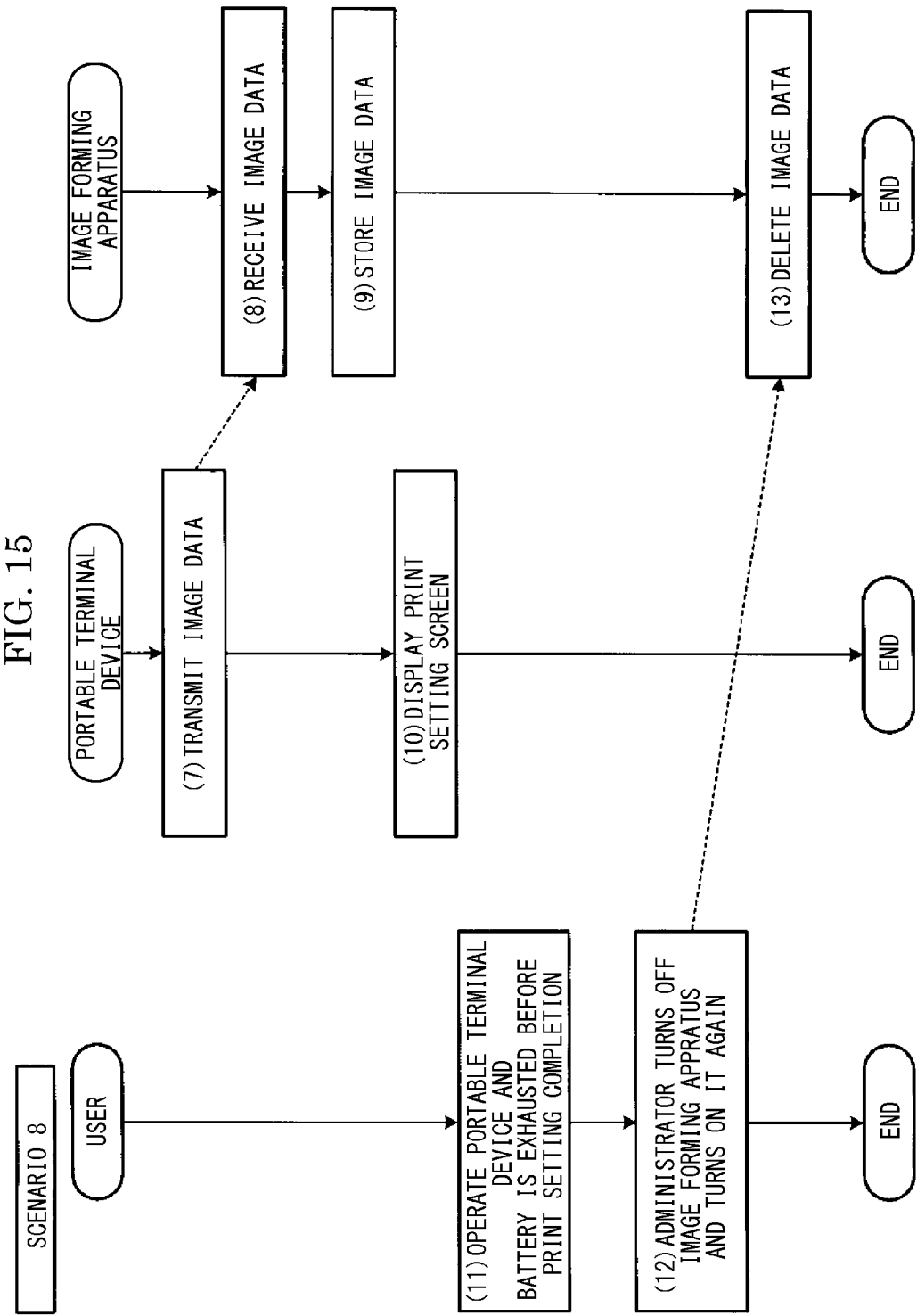
FIG. 15 is a flowchart schematically showing scenario 8 in operation of the image forming system according to the embodiment.

FIG. 15 is an illustrative view illustrating schematically scenario 8. In scenario 8, in the case where the remaining amount of the battery 15 is smaller than the threshold value, the battery 15 is exhausted while in operation of the portable terminal device 10 and power of the image forming apparatus 1 is turned off. Scenario 8 is composed of the seventh step to the thirteenth step below.

(Seventh Step) to (Eleventh Step)

These steps are the same as the seventh step to the eleventh step of scenario 5 shown in FIG. 12, and therefore, a duplicate description is omitted.

(Twelfth Step)

An administrator or the like of the image forming apparatus 1B carries out an operation of turning off the power of the image forming apparatus 1B and then turning on the power again. For example, when the work of the day has completed, the power of the image forming apparatus 1B is turned off, and then, when the work of the next day is started, the power of the image forming apparatus 1B is turned on.

(Thirteenth Step)

When the twelfth step is executed, in the image forming apparatus 1B, the controlling part 500 decides whether or not the image data indicative of the image 21 is stored in the storage part 501. In a case where the controlling part 500 decides that the image data indicative of the image 21 is stored in the storage part 501, the deleting part 503 deletes the image data indicative of the image 21 stored in the storage part 501. When the power of the image forming apparatus 1B is turned off, it is decides that the image 21 is not printed and the image data indicative of the image 21 is deleted from the storage part 501.

That is, according to the embodiment, the deleting part 503 defines a predetermined condition as a case in which the power of the image forming apparatus 1B is turned on again after the power of the image forming apparatus 1B has been turned off.

10. Scenario 9

Figure 16:
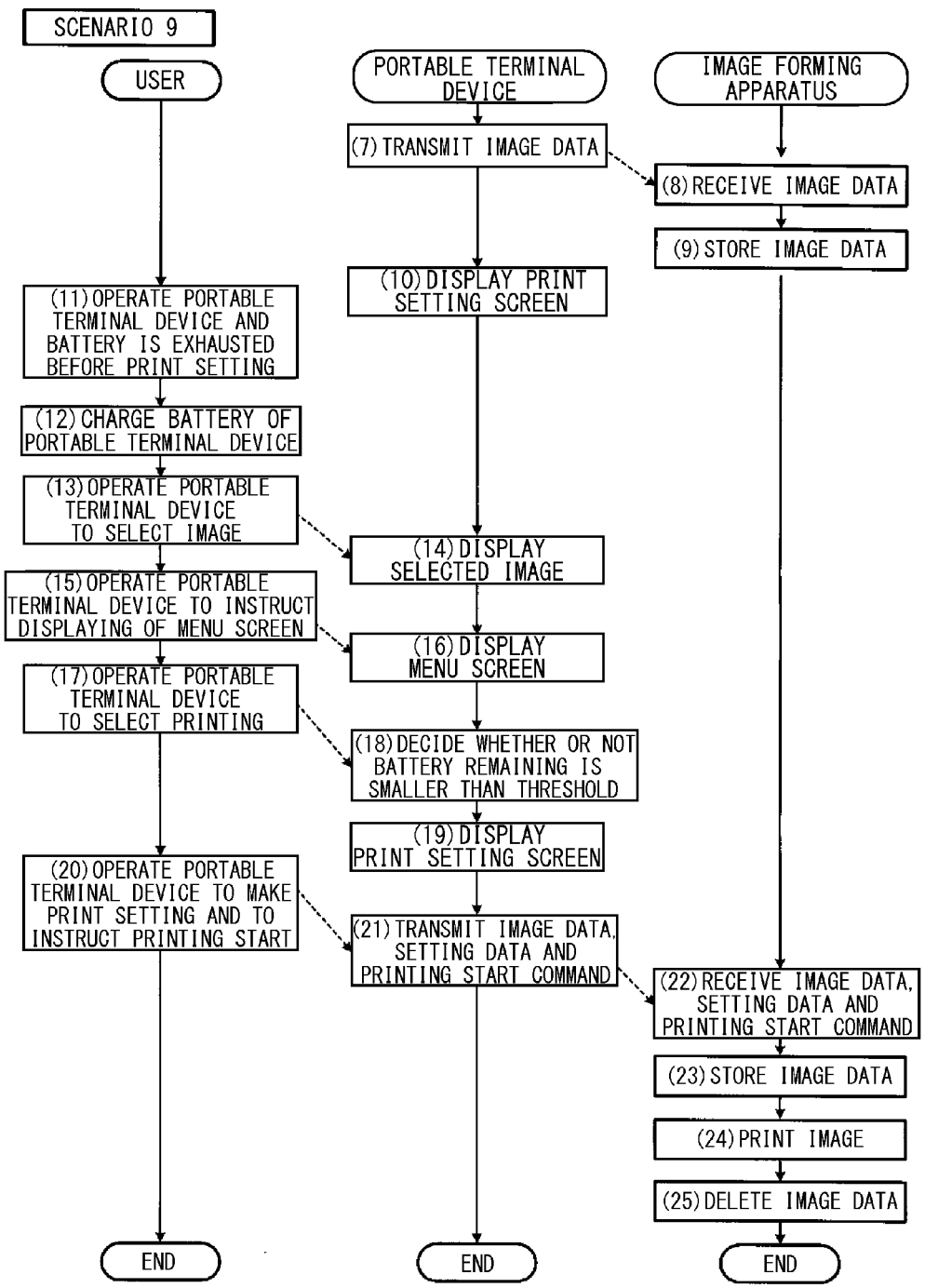
FIG. 16 is a flowchart schematically showing scenario 9 in operation of the image forming system according to the embodiment.

FIG. 16 is an illustrative view illustrating schematically scenario 9. In scenario 9, in the case where the remaining amount of the battery 15 is smaller than the threshold value, the battery 15 is turned off while in operation of the portable terminal device 10 and the battery 15 is charged. Scenario 9 is composed of the seventh step to the twenty-fifth step below.

(Seventh Step) to (Eleventh Step)

These steps are the same as the seventh step to the eleventh step of scenario 5 shown in FIG. 12, and therefore, a duplicate description is omitted.

(Twelfth Step)

The user charges the battery 15 of the portable terminal device 10.

(Thirteenth Step) to (Eighteenth Step)

These steps are the same as the first step to the sixth step of the common scenario shown in FIG. 4 and thus a duplicate description is omitted.

(Nineteenth Step) to (Twenty-Fourth Step)

These steps are the same as the seventh step to the twelfth step of scenario 1 shown in FIG. 7, and therefore, a duplicate description is omitted. Incidentally, it is presumed that the image forming apparatus 1B is set as the image forming apparatus 1 to print the image 21.

(Twenty-Fifth Step)

In the image forming apparatus 1B, the image data indicative of the image 21 transmitted in the ninth step and the twenty-third step is stored in the storage part 501. The image 21 has been printed in the twenty-fourth step and thus these items of image data are unrequired. Therefore, in the image forming apparatus 1B, the deleting part 503 deletes these items of image data stored in the storage part 501.

That is, according to the embodiment, the communication controlling part 18 (the transmission controlling part) carries out second transmission control to cause the communicating part 12 (the transmitting part) to transmit data when the first operation, the second operation and the third operation of instructing image printing is carried out after the first transmission control and in the case where the remaining amount of the battery 15 is the predetermined threshold value or more. The storage part 501 (the second storage part) stores the first data as data transmitted by the first transmission control and the second data as data transmitted by the second transmission control. The printing part 100 executes a print job as to the second data stored in the storage part 501. The deleting part 503 deletes the first data and the second data stored in the storage part 501 in accordance with a predetermined condition defined as a case in which a print job is executed as to the second data.

11. Scenario 10

Figure 17:
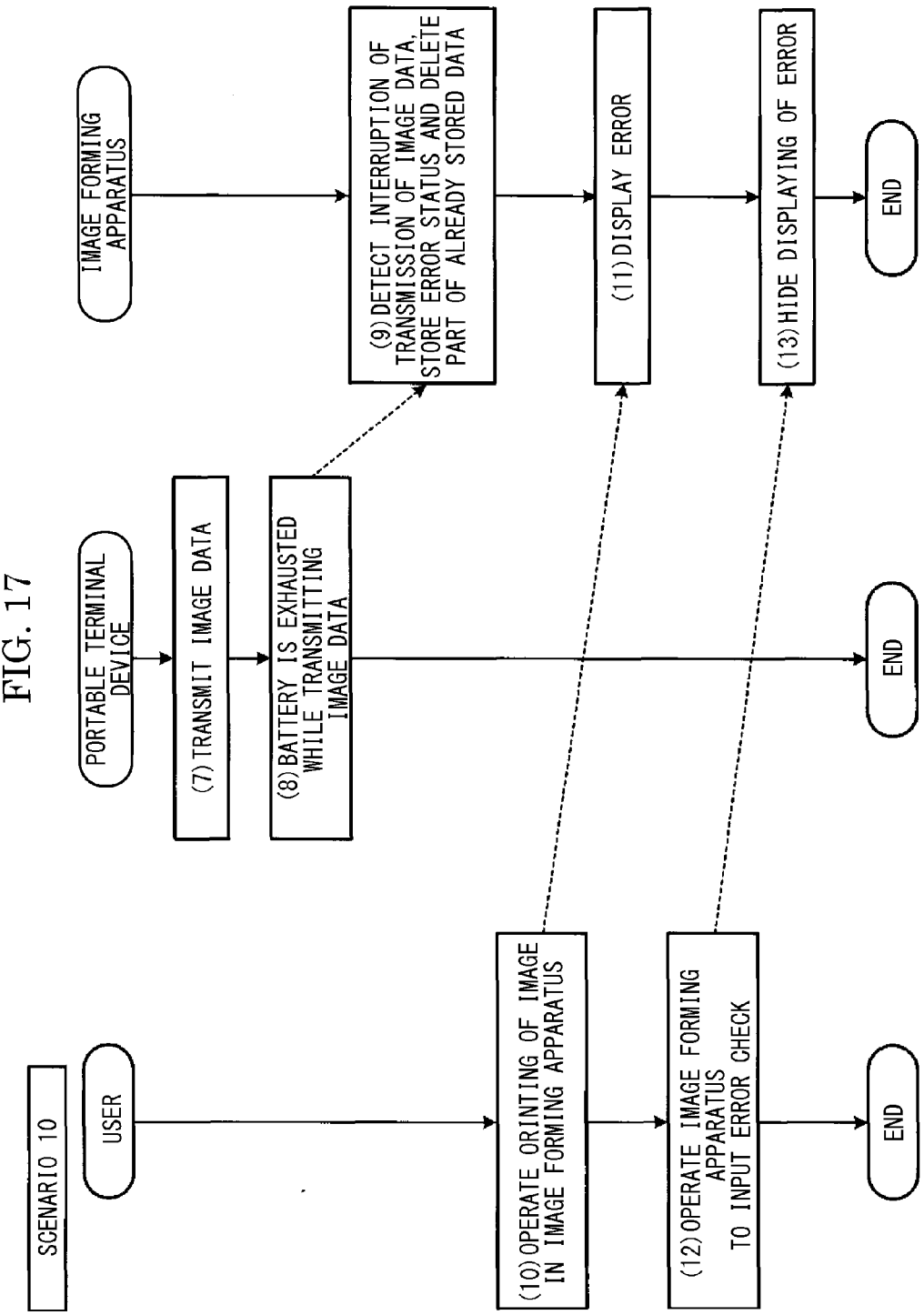
FIG. 17 is a flowchart schematically showing scenario 10 in operation of the image forming system according to the embodiment.

FIG. 17 is an illustrative view illustrating schematically scenario 10. In scenario 10, in the case where the remaining amount of the battery 15 is smaller than the threshold value, the battery 15 is exhausted while image data is transmitted from the portable terminal device 10. Scenario 10 is composed of the seventh step to the thirteenth step below.

(Seventh Step)

This step is the same as the seventh step of scenario 5 shown in FIG. 12, and therefore, a duplicate description is omitted.

(Eighth Step)

The battery 15 of the portable terminal device 10 is exhausted while the portable terminal device 10 transmits the image data indicative of the image 21.

(Ninth Step)

In the image forming apparatus 1B, the network interface part 603 detects interruption of transmission of the image data indicative of the image 21 and the controlling part 500 stores an error status due to interruption of transmission. If a part of the image data indicative of the image 21 is stored in the storage part 501, the deleting part 503 deletes it.

(Tenth Step)

The user of the portable terminal device 10 cannot recognize the state of the eighth step in general. The user of the portable terminal device 10 considers that the image data indicative of the image 21 is transmitted to the image forming apparatus 1B and the user operates the operation part 400 to carry out an operation of printing the image 21 in the image forming apparatus 1B.

(Eleventh Step)

In the image forming apparatus 1B, the controlling part 500 causes the displaying part 403 to display an error indicative of interruption of transmission.

(Twelfth Step)

The user of the portable terminal device 10 operates the operation part 400 to carry out entry for error check in the image forming apparatus 1B.

(Thirteenth Step)

In the image forming apparatus 1B, the control 500 causes the displaying part 403 to carry out control to eliminate (hide) error display.

12. Scenario 11

Figure 18:
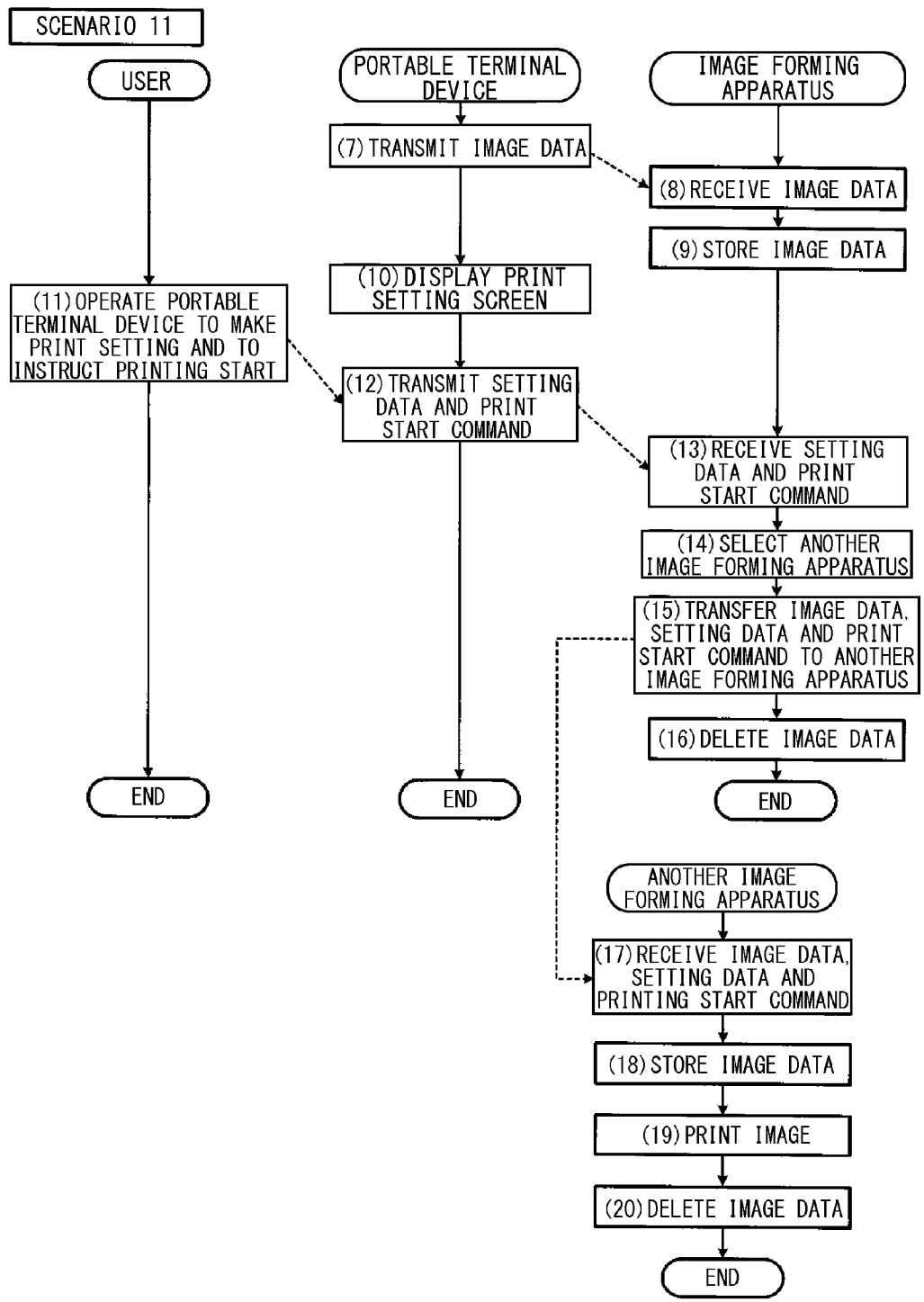
FIG. 18 is a flowchart schematically showing scenario 11 in operation of the image forming system according to the embodiment.

FIG. 18 is an illustrative view illustrating schematically scenario 11. Scenario 11 is a modification example of scenario 3 shown in FIG. 10. The portable terminal device 10 transmits firstly the image data indicative of the image 21 to the image forming apparatus 1B, since the remaining amount of the battery 15 is small. The user carries out the print setting and selects the image forming apparatus 1A in the portable terminal device 10. Scenario 11 is composed of the seventh step to the twentieth step below.

(Seventh Step) to (Thirteenth Step)

These steps are the same as the seventh step to the thirteenth step of scenario 3 shown in FIG. 10, and therefore, a duplicate description is omitted.

(Fourteenth Step)

In the image forming apparatus 1B, the controlling part 500 refers to the setting data received at the thirteenth step, and decides that the image forming apparatus 1A is selected as the image forming apparatus 1 to print the image 21.

(Fifteenth Step)

In the image forming apparatus 1B, the controlling part 500 transfers to the image forming apparatus 1A the image data indicative of the image 21 stored at the ninth step and the setting data and the printing start command received at the thirteenth step.

(Sixteenth Step)

In the image forming apparatus 1B, the deleting part 503 deletes the image data indicative of the image 21 stored in the storage part 501.

(Seventeenth Step)

In the image forming apparatus 1A, the network interface part 603 receives the image data indicative of the image 21, the setting data and the printing start command that are transferred at the fifteenth step.

(Eighteenth Step)

In the image forming apparatus 1A, the controlling part 500 causes the storage part 501 to store the image data indicative of the image 21 received at the seventeenth step.

(Nineteenth Step)

In the image forming apparatus 1A, the controlling part 500 reads out the image data indicative of the image 21 stored in the storage part 501 and causes the printing part 100 to execute a print job printing the image 21 on the basis of the setting data received by the network interface part 603 at the seventeenth step.

(Twentieth Step)

In the image forming apparatus 1A, the deleting part 503 deletes the image data indicative of the image 21 stored in the storage part 501.

Scenario 11 can be expressed as follows. The image forming system 3 includes a plurality of image forming apparatus 1. In the portable terminal device 10, the communication controlling part 18 carries out the first transmission control causing the communicating part 12 to transmit the image data to a predetermined image forming apparatus 1 among the plurality of image forming apparatuses 1. The predetermined image forming apparatus 1 includes a deciding part 701 and a transferring part 702. The deciding part 701 decides whether or not the print setting is provided to cause another image forming apparatus 1 except the predetermined image forming apparatus 1 to print an image in a case where the communication controlling part 18 causes the communicating part 12 to transmit the setting data and the printing start command after the first transmission control. The deciding part 701 is actualized by the controlling part 500. The transferring part 702 transfers the image data, the setting data and the printing start command to such another image forming apparatus 1, in the case where the deciding part 701 decides that the print setting is provided to cause another image forming apparatus 1 to print the image. The transferring part 702 is actualized by the controlling part 500 and the network interface part 603. The printing part 100 of such another image forming apparatus 1 executes the print job on the basis of the image data, the setting data and the printing start command that are transmitted by the transferring part 702.

In the case where the remaining amount of the battery 15 of the portable terminal device 10 is small, the image data is firstly transmitted to the predetermined image forming apparatus 1 among the plurality of image forming apparatuses 1. If the print setting is completed on the print setting screen 40 of the portable terminal device without exhaustion of the battery 15 of the portable terminal device 10, the setting data indicative of the print setting is transmitted to the predetermined image forming apparatus 1. There is a possibility that, when the image forming apparatus 1 to print an image is set on the print setting screen 40 by the user of the portable terminal device 10, the set image forming apparatus 1 is another image forming apparatus 1 except the predetermined image forming apparatus 1. When such an event occurs, the predetermined image forming apparatus transfers the image data, the setting data and the printing start command to such another image forming apparatus. In addition, such another image forming apparatus prints the image indicated by the transferred image data.

Main effects of the embodiment will be described. In a case where the image 21 (FIG. 5) indicated by the image data stored in the portable terminal device 10 is printed by employing the image forming apparatus 1, as shown in FIG. 8, the print setting is carried out on the print setting screen 40 displayed on the operation/display part 14 of the portable terminal device 10. For the sake of this print setting, in the portable terminal device 10, for example, the following power is consumed.

The power for controlling and displaying the print setting screen 40 on the operation/display part 14 is consumed. The power for turning on the backlight of the operation/display part 1 is consumed. The power required for processes generated by touching the icons 41 to 44 on the print setting screen 40 is consumed. Because the print setting screen 40 is small in size, it is necessary to change from the present screen to a lower hierarchical screen for the sake of the print setting, and the power is consumed for process of changing to the lower hierarchical screen. Because the print setting comes under a prohibition (for example, no toner or no sheet) in the image forming apparatus 1, the power is consumed for process of inquiring the image forming apparatus 1 about the fact.

Thus, because the power required for the print setting is not so small, in the case where the remaining amount of the battery 15 is small, there is a possibility that the battery 15 is exhausted for the sake of the power required for the print setting.

In the embodiment, therefore, as has been described in the common scenario shown in FIG. 4, if printing is selected in the portable terminal device 10 (the fifth step), the portable terminal device 10 decides whether or not the remaining amount of the battery 15 is smaller than the predetermined threshold value (the sixth step). In the case where the portable terminal device 10 decides that the remaining amount of the battery 15 is smaller than the predetermined threshold, the portable terminal device 10 transmits the image data indicative of the image 21 to the image forming apparatus 1 before switching from the menu screen 30 (FIG. 6) to the print setting screen 40 (FIG. 8) (for example, the seventh step of scenario 3 shown in FIG. 10 and the seventh step of scenario 5 shown in FIG. 12). That image data is stored in the storage part 501 included in the image forming apparatus 1 (for example, the ninth step of scenario 3 and the ninth step of scenario 5).

Accordingly, even if the battery 15 of the portable terminal device 10 is exhausted before the print setting is completed on the print setting screen 40 of the portable terminal device 10, the user operates the image forming apparatus 1, whereby the image can be printed (for example, the twelfth step and the thirteenth step of scenario 5). On the other hand, if the print setting is completed on the print setting screen 40 of the portable terminal device 10 without exhaustion of the battery 15 of the portable terminal device 10, the portable terminal device 10 transmits the setting data indicative of the print setting to the image forming apparatus 1, whereby the image can be printed on the image forming apparatus 1 (for example, the tenth step to the fourteenth step of scenario 3).

Also, according to the embodiment, the image data indicative of the image 21 stored in the storage part 501 of the image forming apparatus 1 is deleted with appropriate timing (the thirteenth step of scenario 1 shown in FIG. 7, the fifteenth step of scenario 3 shown in FIG. 10, the fourteenth step of scenario 4 shown in FIG. 11, the fourteenth step of scenario 5 shown in FIG. 12, the thirteenth step of scenario 6 shown in FIG. 13, the twelfth step of scenario 7 shown in FIG. 14, the thirteenth step of scenario 8 shown in FIG. 15, the twenty-fifth step of scenario 9 shown in FIG. 16, the sixteenth step and the twentieth step of scenario 11 shown in FIG. 18). Therefore, it is possible to prevent that available capacity of the storage part 501 is decreased because the data indicative of the image transmitted from the portable terminal device 10 is accumulated into the storage part 501.

In the embodiment, by utilizing the access point 5 shown in FIG. 1, the image data indicative of the image 21 is transmitted from the portable terminal device 10 to the image forming apparatus 1. Without being limited thereto, there may be a mode in which the portable terminal device directly transmits the image data indicative of the image 21 to the image forming apparatus 1 by wireless communication, causing the image forming apparatus 1 to print the image 21.

While the present disclosure has been described with reference to the preferable embodiment of the image forming apparatus of the disclosure and the description has technical preferable illustration, the disclosure is not to be restricted by the embodiment and illustration. Components in the embodiment of the present disclosure may be suitably changed or modified, or variously combined with other components. The claims are not restricted by the description of the embodiment.

What is claimed is:

1. An image forming system comprising:
a portable terminal device; and
an image forming apparatus,
the portable terminal device including:
a first storage part configured to store data indicative of an image;
a transmitting part configured to transmit the data stored in the first storage part by wireless communication;
a displaying part;
a first operation part configured to receive a first operation of selecting the image and a second operation of selecting printing; and
a transmission controlling part configured to carry out first transmission control to cause the transmitting part to transmit the data before a print setting screen is displayed on the displaying part when the first operation and the second operation are carried out, in a case where a remaining amount of a battery as a power source of the portable terminal device is smaller than a predetermined threshold value,
the image forming apparatus including:
a second storage part configured to store the data transmitted by the first transmission control; and
a printing part configured to execute a print job printing the image indicated by the data stored in the second storage part.

2. The image forming system according to claim 1, wherein the image forming apparatus further includes:
a second operation part making an operation of print setting of the image indicated by the data stored in the second storage part and an operation of instructing the print job, and
the printing part executes the print job on the basis of the print setting, when the operation of the print setting is carried out and the operation of instructing the print job are carried out in the second operation part, whereby the printing part executes the print job based on the print setting.

3. The image forming system according to claim 1, wherein
the printing part executes the print job on the basis of print setting indicated by setting data, in a case where the transmission controlling part causes the transmitting part to transmit the setting data indicative of the print setting inputted to the print setting screen and a printing start command after the first transmission control.

4. The image forming system according to claim 1, wherein the portable terminal device further includes:
a controlling part causing the displaying part to display the print setting screen after the first transmission control.

5. The image forming system according to claim 1, wherein the image forming apparatus further includes:
a deleting part configured to delete the data stored in the second storage part in accordance with a predetermined condition after the first transmission control.

6. The image forming system according to claim 5, wherein the deleting part deletes the data stored in the second storage part on the predetermined condition defined as a case in which the print job is executed.

7. The image forming system according to claim 5, wherein the deleting part deletes the data stored in the second storage part on the predetermined condition defined as a case in which the transmission controlling part causes the transmitting part to transmit a print cancellation command.

8. The image forming system according to claim 5, wherein the deleting part deletes the data stored in the second storage part on the predetermined condition defined as a case in which predetermined time has elapsed after the data has stored in the second storage part.

9. The image forming system according to claim 5, wherein the deleting part deletes the data stored in the second storage part on the predetermined condition defined as a case in which power of the image forming apparatus is turned on again after the power of the image forming apparatus has been turned off.

10. The image forming system according to claim 5, wherein
the transmission controlling part carries out second transmission control to cause the transmitting part to transmit the data when the first operation, the second operation, and a third operation of instructing printing of the image are carried out, after the first transmission control and in a case where the remaining amount of the battery is the predetermined threshold value or more, the second storage part stores first data that is the data transmitted by the first transmission control and second data that is the data transmitted by the second transmission control, the printing part executes the print job as to the second data stored in the second storage part, and the deleting part deletes the first data and the second data stored in the storage part on the predetermined condition defined as a case in which the print job is executed as to the second data.

11. The image forming system according to claim 2, wherein the image forming apparatus further includes:

a deleting part deleting the data stored in the second storage part in a case where an operation of cancelling the print job is carried out as to the data stored in the storage part in the second operation part.

12. The image forming system according to claim 1 further comprising a plurality of the image forming apparatuses, wherein the transmission controlling part carries out the first transmission control for the transmitting part to transmit the data to a predetermined image forming apparatus among the plurality of the image forming apparatuses, the predetermined image forming apparatus further includes:

a deciding part configured to decide whether or not the print setting is provided to cause another image forming apparatus except the predetermined image forming apparatus to print the image, in a case where the transmission controlling part causes the transmitting part to transmit the setting data indicative of the print setting inputted to the print setting screen and a printing start command after the first transmission control; and a transferring part configured to transfer the data, the setting data and the printing start command to said another image forming apparatus, in a case where the deciding part decides that the print setting is provided to cause said another image forming apparatus except the predetermined image forming apparatus to print the image, and the printing part of said another image forming apparatus executes the print job on the basis of the data, the setting data and the printing start command that are transferred by the transferring part.

13. A non-transitory storage medium included in a portable terminal device to store a program for portable terminal device, wherein the program causes the first storage part to store data indicative of an image; transmits the data stored in the first storage part by wireless communication; causes a first operation part to receives a first operation of selecting the image and a second operation of selecting printing; and carries out first transmission control to transmit the data stored in the first storage part, before a displaying part of the portable terminal device is caused to display a print setting screen, when the first operation and the second operation are carried out, in a case where a remaining amount of a battery as a power source of the portable terminal device is smaller than a predetermined threshold value.

14. A non-transitory storage medium included in an image forming apparatus capable of communicating with the portable terminal device including the storage medium according to claim 13 to store a program for image forming apparatus, wherein the program causes a second storage part to store the data transmitted by the first transmission control in accordance with executing of the program for portable terminal device and executes a print job to print the image indicated by the data stored in the second storage part.

15. A non-transitory storage medium storing the program for image forming apparatus according to claim 14, wherein the program for image forming apparatus causes a computer of the image forming apparatus to delete the data stored in the second storage part in accordance with a predetermined condition after the first transmission control.

* * * * *